(12) United States Patent
Lemon et al.

(10) Patent No.: US 10,670,253 B1
(45) Date of Patent: Jun. 2, 2020

(54) LIGHT-EMITTING DEVICE

(71) Applicants: Peter Lemon, Cedar Hills, UT (US); Justin Eldredge, Eagle Mountain, UT (US); Devin Miller, Highland, UT (US); Tyrell Turley, Kaysville, UT (US); Ryker Haddock, Provo, UT (US)

(72) Inventors: Peter Lemon, Cedar Hills, UT (US); Justin Eldredge, Eagle Mountain, UT (US); Devin Miller, Highland, UT (US); Tyrell Turley, Kaysville, UT (US); Ryker Haddock, Provo, UT (US)

( * ) Notice: Subject to any disclaimer, the term of this patent is extended or adjusted under 35 U.S.C. 154(b) by 0 days.

(21) Appl. No.: 16/249,486

(22) Filed: Jan. 16, 2019

(51) Int. Cl.
| | |
|---|---|
| *F21V 23/04* | (2006.01) |
| *F21V 23/02* | (2006.01) |
| *F21V 23/00* | (2015.01) |
| *H02J 7/00* | (2006.01) |
| *H05B 45/00* | (2020.01) |
| *H05B 47/10* | (2020.01) |

(52) U.S. Cl.
CPC ........ *F21V 23/0421* (2013.01); *F21V 23/007* (2013.01); *F21V 23/023* (2013.01); *H02J 7/00* (2013.01); *H05B 45/00* (2020.01); *H05B 47/10* (2020.01); *H02J 2007/0062* (2013.01)

(58) Field of Classification Search
CPC .. F21V 23/0421; F21V 23/007; F21V 23/023; H02J 7/0052; H02J 2007/0062; H05B 33/0842; H05B 37/0209
See application file for complete search history.

(56) References Cited

U.S. PATENT DOCUMENTS

| | | | |
|---|---|---|---|
| 5,552,973 A | 9/1996 | Hsu | |
| 6,085,121 A * | 7/2000 | Stern | B23Q 17/12 340/680 |
| 7,582,838 B2 * | 9/2009 | Sharrah | H01H 9/06 200/310 |
| 9,316,366 B2 * | 4/2016 | Parsons | F21L 4/005 |
| 2008/0290855 A1 * | 11/2008 | Fishman | H02J 7/0063 323/318 |
| 2012/0224358 A1 * | 9/2012 | Noble | F21L 4/027 362/158 |

FOREIGN PATENT DOCUMENTS

CN 205619039 U * 10/2016

* cited by examiner

*Primary Examiner* — Mary Ellen Bowman
(74) *Attorney, Agent, or Firm* — Surroion Business Law

(57) ABSTRACT

A light emitting device offers a plurality of modes and sub-modes, comprising a housing that contains a microcontroller, a power bank, a rechargeable battery, a light source, an arc lighter configured to create a spark, a USB charging port, and an operative component to allow a user to selectively actuate a flashlight mode, an arc mode, and a USB charging mode.

20 Claims, 36 Drawing Sheets

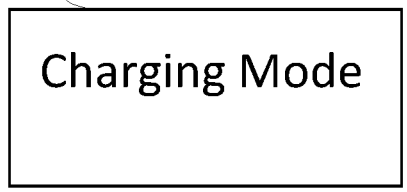
FIG. 31
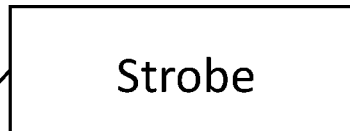
FIG. 32

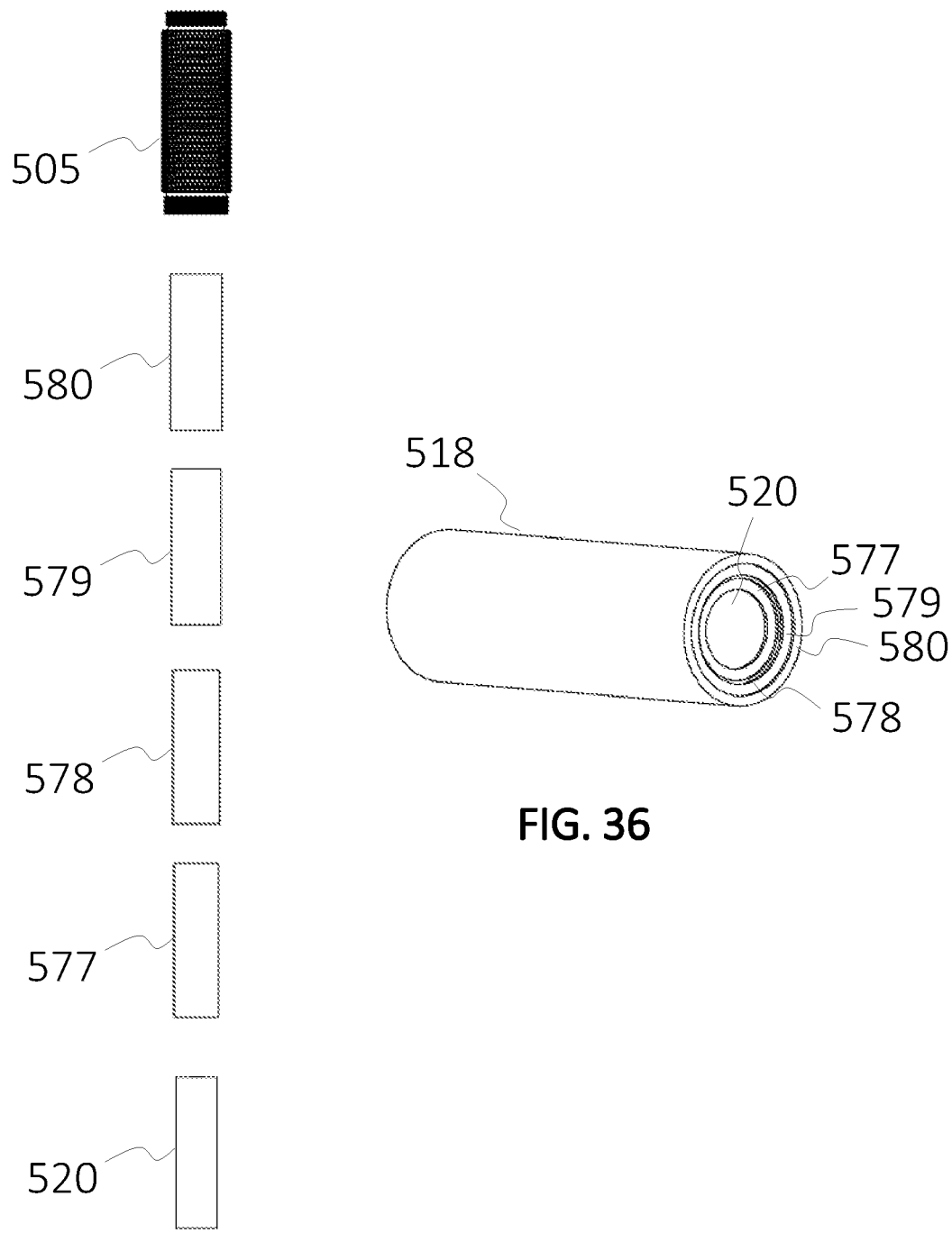

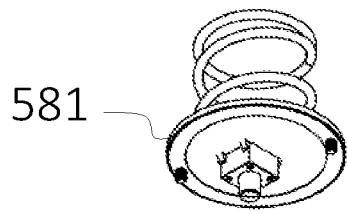
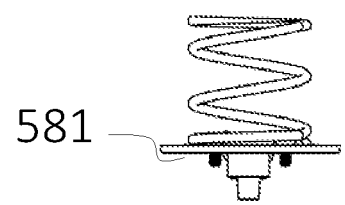
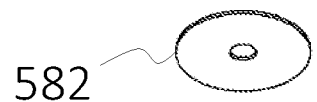
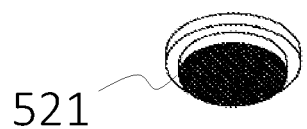
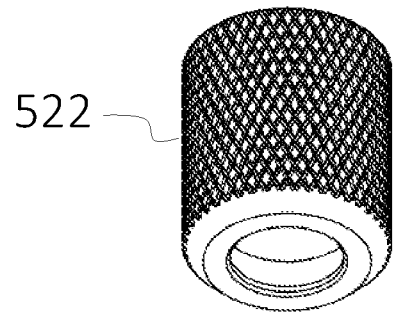
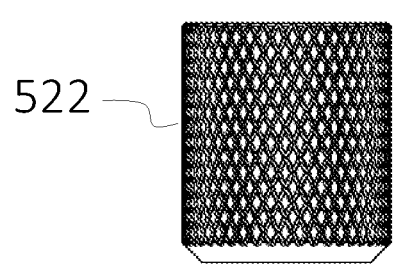
FIG. 38a FIG. 38b

ID-EMITTING DEVICE

BACKGROUND

Many activities benefit from not having to carry around bulky items. For example, camping, hiking, backpacking, hunting, other backcountry activities, and off-the-grid activities may all benefit at times by keeping personal items both minimal and manageable. A person can often do more and see more when not experiencing heavy loads to bear. Also, a person can often be more efficient when personal items that are brought are kept in an organized manner.

DESCRIPTION OF THE DRAWINGS

FIG. 31 illustrates an example diagram of features according to an example of principles described herein.

FIG. 32 illustrates an example diagram of features according to an example of principles described herein.

FIG. 35 illustrates an exploded view of a battery module of the light emitting device according to an example of principles described herein.

FIG. 36 illustrates a perspective view of a battery module of the light emitting device according to an example of principles described herein.

FIG. 38a illustrates an exploded view of a portion of the light emitting device according to an example of principles described herein.

FIG. 38b illustrates an exploded view of a portion of the light emitting device according to an example of principles described herein.

DETAILED DESCRIPTION

The following relates to a utility light emitting device that benefits from a power bank and a battery. In addition to emitting light via a light source, the device may further include an arc lighter, USB charging port, and a battery boost.

An example light emitting device according to principles described herein includes a housing. The housing defines a cavity containing a microcontroller, a power bank, and a battery. A light source within the housing emits light away from the housing. An arc lighter at or near an end of the device is configured to create a spark. The light source and the arc lighter are each functionally connected to at least one of the battery and the power bank. The housing further includes at least one USB charging port that is to receive power to charge the battery and provide charge to an external device. At least one operative component on the housing allows a user to selectively actuate a flashlight mode, an arc mode, and a USB charging mode.

Another example light emitting device according to principles described herein includes a housing with a cavity for containing a power bank and a battery power source. A light source within the housing is configured to emit light away from the housing. A USB charging port within the housing is configured to receive charge. Alternatively, or in conjunction, the USB charging port is configured to provide charge. The charge may be used to charge the battery or provide charge to an external device. The light source and the USB charging port are functionally connected to one or more of the power bank and the battery power source.

Figure 1:
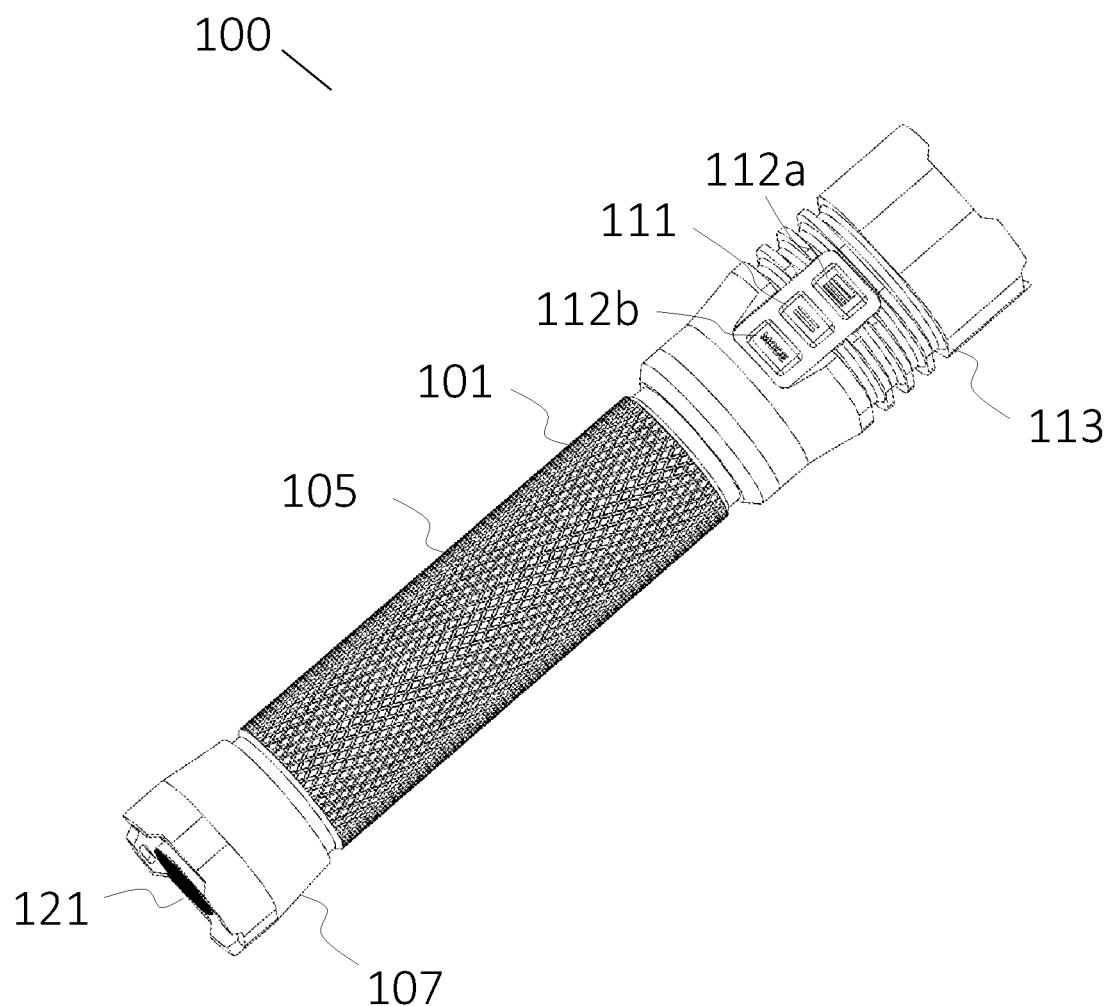
FIG. 1 illustrates a perspective view of a light emitting device according to an example of principles described herein.

Turning to FIG. 1, a light emitting device 100 is shown that includes an elongate cylindrical body with a housing 101 in a main body, a light producing head 113 at a head end and an arc lighter 107 at a tail end. At least a portion of the housing 101 may include a generally cylindrical handle 105 as shown. Control over various modes of the device are accomplished with operative components, such as operative components 112a, 112b and tail cap button 121. The operative components may include one or more of a switch, button, dial, touch surface, heat sensor, or other type of control component. As shown, the components 112a, 112b and tail cap button 121 each include a button to toggle between modes. The modes currently being utilized are communicated with an indicator light 111, such as an LED light, to a user. Multiple lights may be used in tandem or in isolation to indicate various modes and submodes (described below), status, etc.

The device may include one or more utility features called modes. There may also be sub-modes for each mode. The modes are accessed by activating the operative components 112a, 112b, and 121. For example, the modes may be cycled by activating one operative component or two operative components at the same time. If the operative components are buttons, the buttons can be activated by being pressed down at the same time. The buttons may also be pressed down and held for a period of time such as several seconds. The indicator light 111 emits a light to indicate the current mode. The indicator light 111 may be a colored light according to which mode is currently in place. A plurality of lights may also be used.

Figure 2:
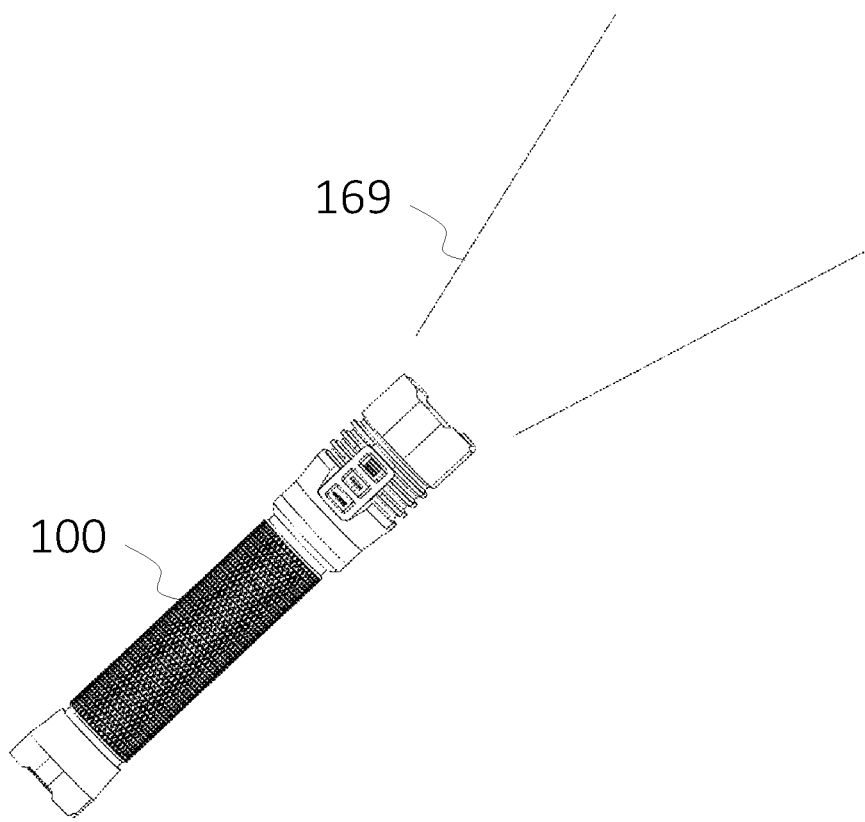
FIG. 2 illustrates a perspective view of a light emitting device according to an example of principles described herein.
Figure 6:
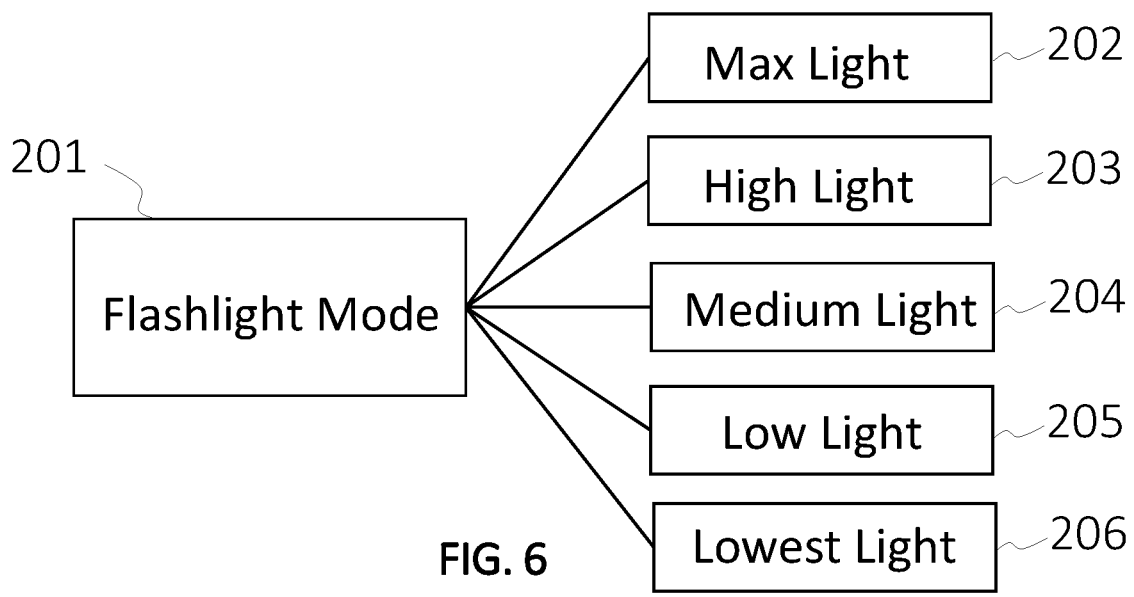
FIG. 6 illustrates an example diagram of features according to an example of principles described herein.

In FIG. 2, the device 100 is shown emitting light 169 in Flashlight Mode 201 (see FIG. 6). The indicator light 111 will illuminate a light, for example, a green light, while in this mode. FIG. 6 shows the Flashlight Mode 210 having sub-modes in descending order of brightness Max Light 202, High Light 203, Medium Light 204, Low Light 205, and Lowest Light 206. Max Light 202 corresponds to a maximum brightness that the device 100 can emit. Lowest Light 206 emits a lowest brightness that the device 100 can emit. Intermediary levels of light, High Light 203, Medium Light 204, and Low Light 205 are between the Max Light 202 and Lowest Light 206 in descending order of brightness level. When the device is powered on both momentarily or full toggle, it will default to Flashlight Mode 201 and the last brightness sub-mode used. The indicator light 111 may change brightness level according to the sub-mode level of brightness.

Figure 3:
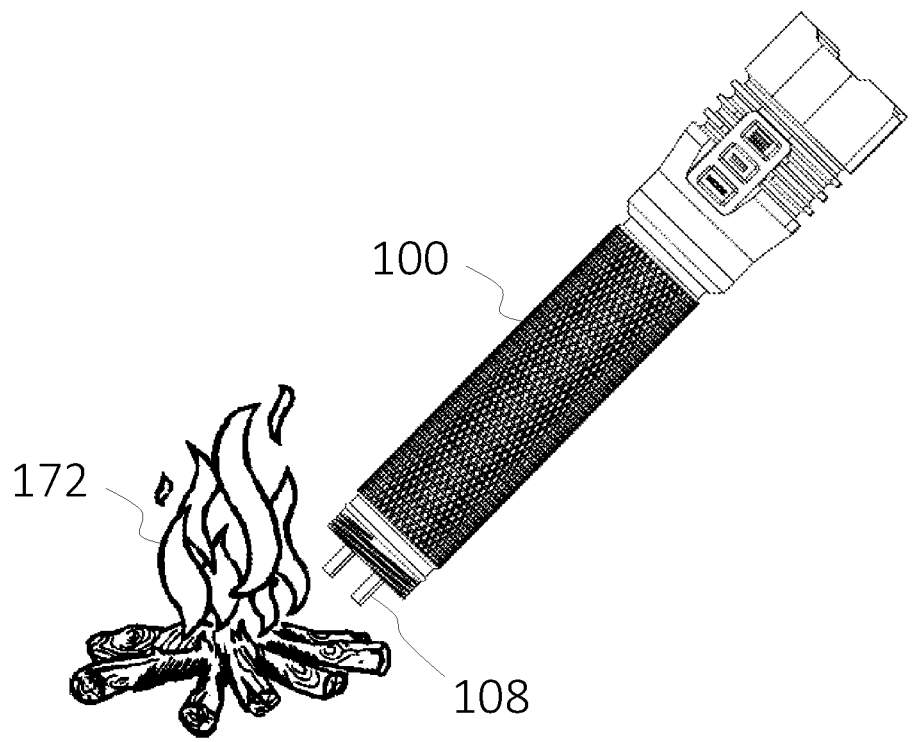
FIG. 3 illustrates a perspective view of a light emitting device according to an example of principles described herein.
Figure 7:
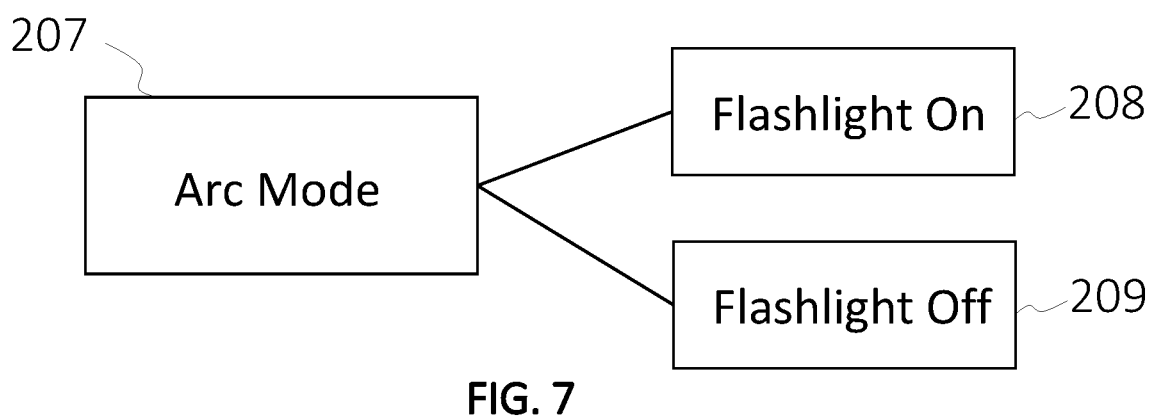
FIG. 7 illustrates an example diagram of features according to an example of principles described herein.

In FIG. 3, the device 100 is shown sparking a fire 172 with its arc prongs 108 in Arc Mode 207 (see FIG. 7). The indicator light 111 will emit a light, for example, a red light, while in this mode. For the Arc Mode 207, the arc prongs 108 are activated by pressing and holding one of the operative components 112a, 112b and 121 down. If the light in the Flashlight Mode 201 is turned on while one of the operative components is used to activate a mode or sub-mode, the light will remain turned on. FIG. 7 shows the Arc Mode 207 having Sub-modes Flashlight On 208 and Flashlight Off 209. The Sub-mode Flashlight On 208 allows the light to be turned on if it was not on when the Arc Mode 207 was activated. The Sub-mode Flashlight Off 209 allows the light being emitted during the Arc Mode 207 or Sub-mode Flashlight On 208 to be turned off during the respective mode 207 and sub-mode 208. Variations include that activation of the sub-mode may be conducted by any operative component 112a, 112b, and 121.

Figure 4:
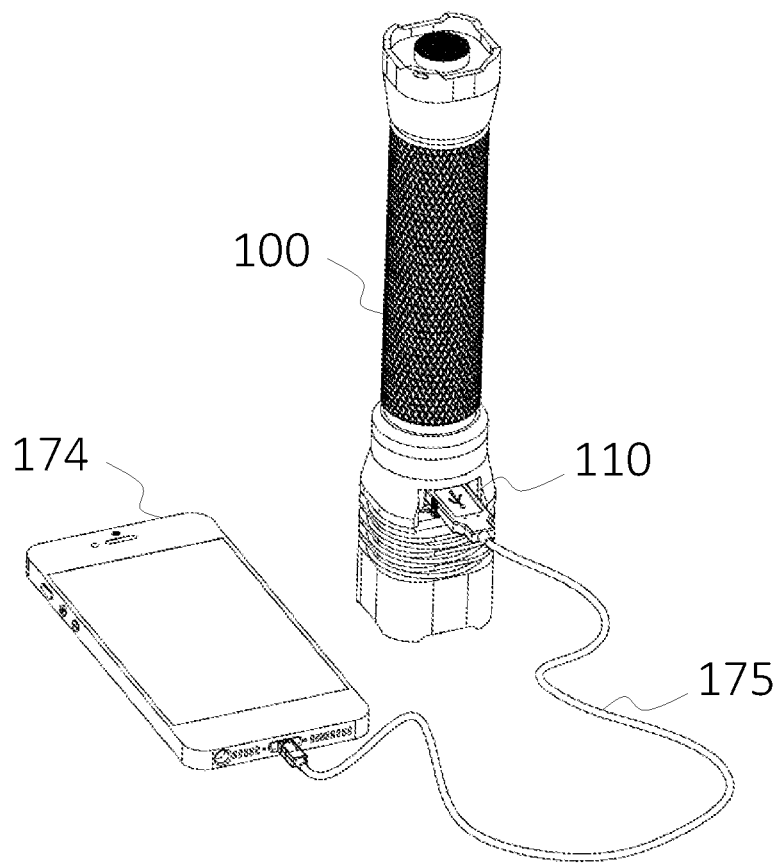
FIG. 4 illustrates a perspective view of a light emitting device according to an example of principles described herein.
Figure 8:
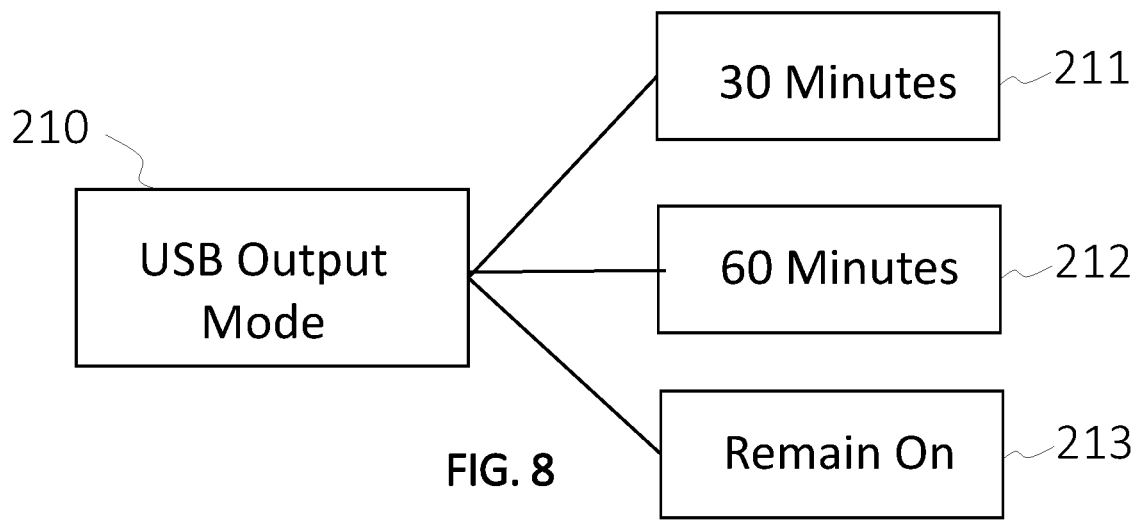
FIG. 8 illustrates an example diagram of features according to an example of principles described herein.

In FIG. 4, the device 100 is shown charging a mobile device 174 with USB output port 110 and charging cable 175 in USB Output Mode 210 (see FIG. 8). The indicator light 111 will emit a light, for example, a blue light, while in this mode. USB Output Mode 210 is activated when a device 100 is plugged into the USB output port 110 with a charging cable 175. Sub-modes may be cycled through by pressing one or more of the operative components 112a, 112b and 121. The indicator light 11 may communicate change by changing the light color, type of light (e.g. state (flickering, steady, etc.), brightness, etc.)

In an exemplary operation, the indicator light 111 indicates a charging time. In the First Sub-mode 211, the indicator light 111 flickers once to signal a 30 Minute 211 charging time and then automatically shuts off. This time limit prevents the battery from being drained more than necessary. In the Second Sub-mode 212, the indicator light 111 flickers twice to signal a 60 Minute 212 charging time and then automatically shuts off. Here again, this time limit prevents the battery from being drained more than necessary. In the third Sub-mode 213, the indicator light 111 flickers three times to signal Remain On 213 such that USB Output Mode 210 remains on until the device is turned off or until it runs out of battery power. Other sub-modes and signals are fully anticipated.

Note that more than one mode and sub-mode may be activated at the same time. As discussed above, Arc Mode 207 may occur while the device is emitting light. In another example, a device may be charged by USB output port 110 while the light of the device is being emitted. Other variations are also anticipated. When more than one mode or sub-mode is being utilized, the indicator light 111 may show whichever mode or sub-mode was used previously. Alternatively, the indicator light 111 may show the mode or sub-mode according to an order of a pre-defined order. Once a mode or sub-mode has ended or the battery has reached a low point, the indicator light 111 may turn off to indicate that the mode or sub-mode is over.

Figure 5:
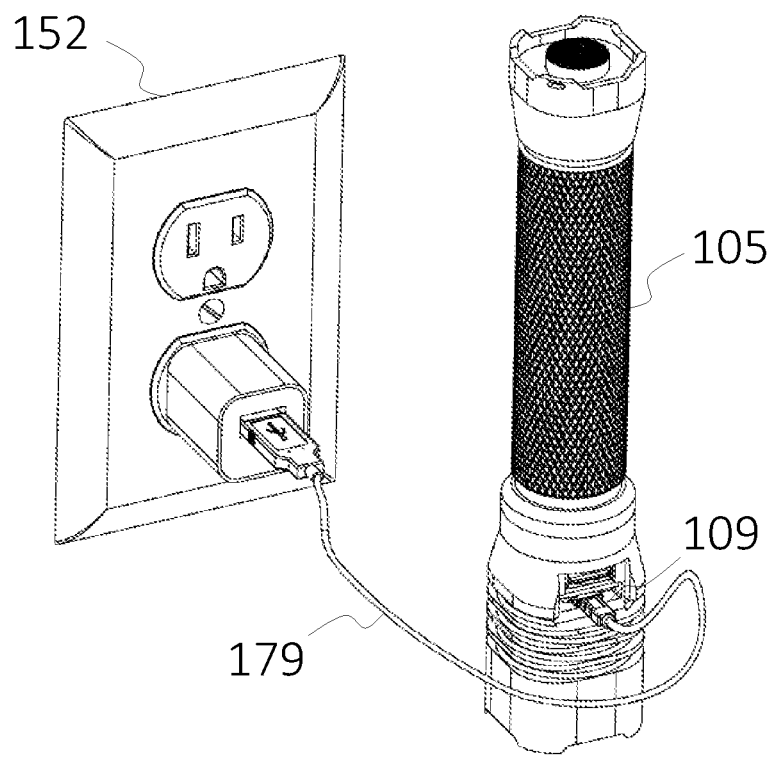
FIG. 5 illustrates a perspective view of a light emitting device according to an example of principles described herein.
Figure 9:
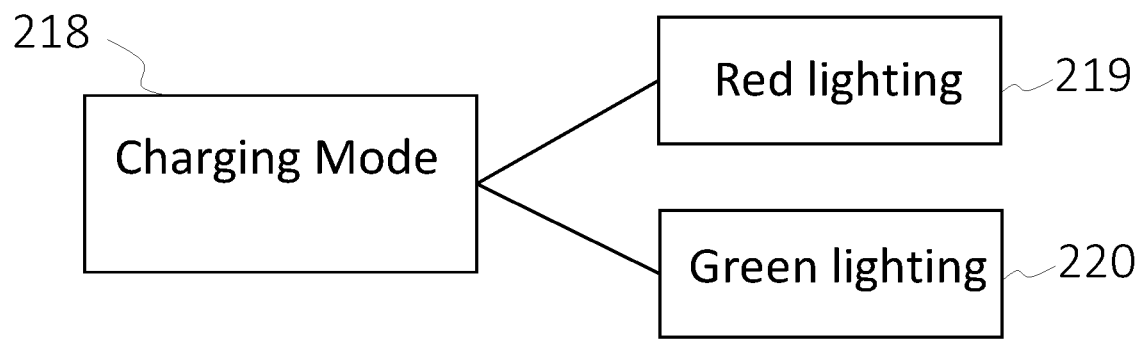
FIG. 9 illustrates an example diagram of features according to an example of principles described herein.

In FIG. 5, the device 100 itself is shown being charged through a USB input port 109 while the device is plugged into an electrical outlet 152. This is referred to as a Charging mode 218 (see FIG. 9). The indicator light 111 may emit a light or a light pattern to indicate that the device 100 is being charged. For example, the device 100 may emit a fading red light that will dim and brighten repeatedly from 10% to 100% to provide a glowing effect. When the battery is fully charged, the indicator light 111 emits a second light or light pattern. For example, the indicator light 111 may emit a solid green light to indicate that the battery is full.

Note that the USB input port 109 and the USB output port 110 may be a micro-USB port or other type of port that provides an electrical connection for charging input and output. Also, a single port is anticipated to be used as both a USB input port and a USB output port.

Figure 10:
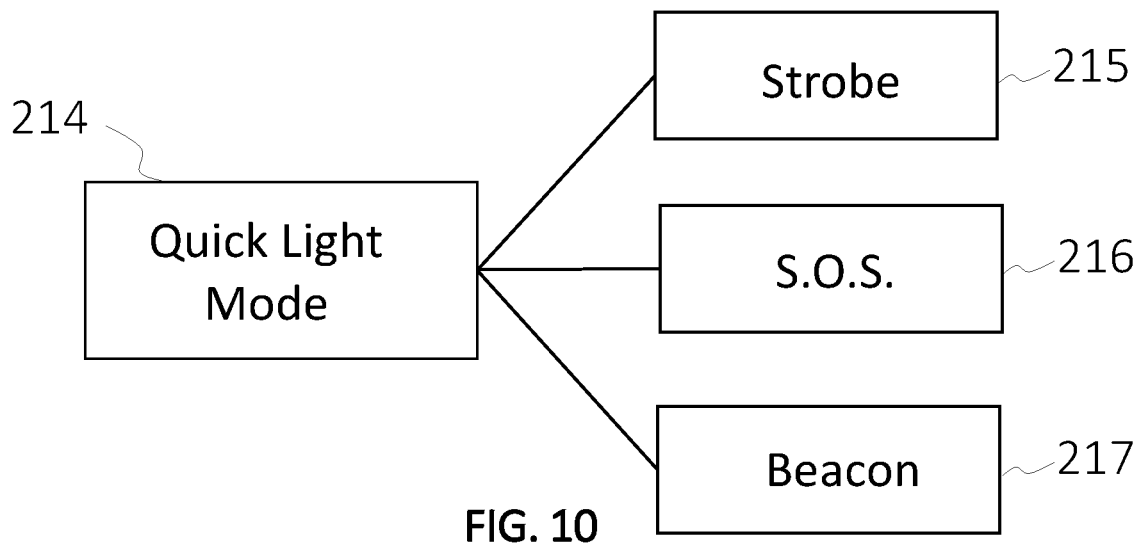
FIG. 10 illustrates an example diagram of features according to an example of principles described herein.

In FIG. 10, Quick Light Mode 214 is shown that bypasses or overrides any other mode. This mode may be accessible, for example, by activating, (e.g., pressing and holding, etc.) both the operative components 112a and 112b for a period of time, such as a second, while in any mode. Emergencies may occur that make this feature quite helpful and possibly life-saving when communication to others is critical.

Sub-mode Strobe 215 makes the light of the device 100 flicker rapidly on Max Brightness. The Sub-mode S.O.S. 216 will signal S.O.S. in morse code on Max Brightness. The Sub-mode Beacon 217 makes the light quickly flash on Max Brightness every 4 seconds. One of the sub-modes, such as the Sub-mode Strobe 215, may be the default mode that occurs when the Quick Light Mode 214 is activated.

Figure 11:
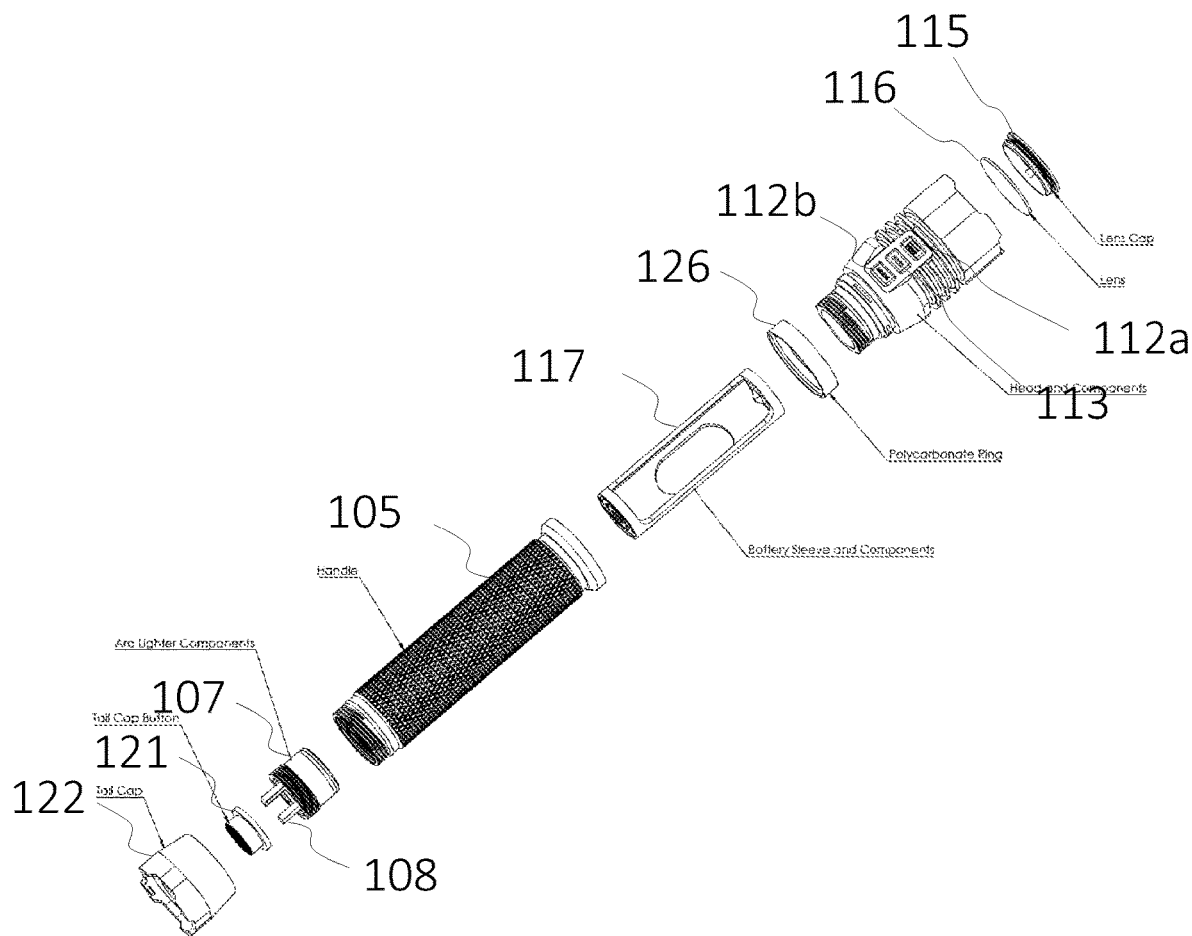
FIG. 11 illustrates an exploded view of the light emitting device according to an example of principles described herein.
Figure 12:
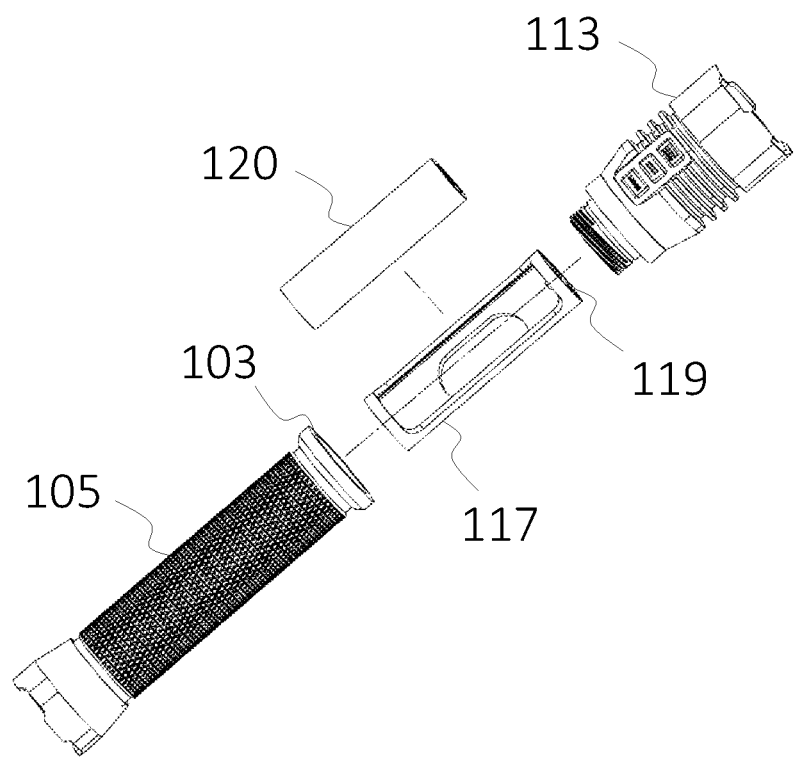
FIG. 12 illustrates an exploded view of the light emitting device according to an example of principles described herein.

Turning to FIGS. 11 and 12, an exploded view of the device 100 is shown, including a lens cap 115, lens 116, head 113, ring 126, a battery sleeve 117, handle 105, arc lighter 107, tail cap button 121, and tail cap 122. The lens cap 115 is an annular outer cover located at ahead end of the device 100 and that protects the light source (not shown) within the head 113 of the device 100. The lens 116 of the device comprises an annular piece of glass, plastic, or other transparent material that may include curved sides for focusing or modifying the direction of light rays. One or more of the lens cap 115 and lens 116 may include threads for being threaded to corresponding threads on the head 113. Other fastening means, such as a friction fit, snap fit, or other fit is anticipated for mating the various components. Located on the head are operative components 112a, 112b, and 121 for manual activation and operation of features of the device discussed herein.

The handle 105 or other part of the housing 101 is a cylindrical body that includes a central cylindrical cavity in which a battery module 117 may be removably inserted. An exterior surface of the handle 105 may have ribs, knurling, or other surface features to improve hand grip. A central opening 103 of the cavity is shown at the head end of the handle into which the battery module 117 may be removably inserted. The battery module 117 comprises a cylindrical cavity with a central opening toward a head end into which a battery 120 is removably inserted. Alternatively, openings may be on the side of the battery module 117 or toward the tail end of the battery module 117. The battery 120 may be standard or rechargeable.

The arc lighter 107 is located at the tail end of the device 100 and includes arc prongs 108 that create a spark. As shown, the arc lighter 107 includes a cylindrical body with two arc prongs 108 which may comprise two ceramic electrodes that extend outward from the device and which create a small electrical arc between them. The cylindrical body of the arc lighter 107 may include threads for being threaded to corresponding threads on a tail facing side of the handle 105 or other portion of the housing 101. Other fastening means, such as a friction fit, snap fit, or other fit is anticipated for mating the various components.

A tail cap 122 covers the arc lighter 107 when the arc lighter 107 is not in use to protect the arc lighter 107. The tail cap 122 includes a generally cylindrical body that fits over the arc prongs 108 and connects to the arc lighter 107 or handle 105 or another portion of the housing 101. Fastening means includes threads with corresponding threads on the arc lighter 107, handle 105, or other portion of the housing 101.

The tail cap 122 further includes an operative component, such as tail cap button 121 shown, that extends outwardly from the tail cap 122 and that may be manually pressed to operate at least one feature of the device. The cap button may be recessed, flush with, or extend outwardly from the tail cap 122.

The tail cap button 121 includes a button centrally located on the tail cap 122 and facing outward of the tail end of the device. The tail cap button 121 includes an annular ridge that abuts against an interior ridge or shoulder or other surface of the tail cap 122. The fit may be a slidable fit or friction fit or other type of fit that allows the tail cap button 121 to be accessible at the free end of the tail cap. In assembly form, a space is provided to allow both the button 121 and the arc prongs 108 to nest inside the tail cap 122.

A free end of the tail cap 122 may be configured to enable the device 100 to be stood upright on a flat surface. For example, the tail cap 122 may have legs, ridges, or outer edges to stand on a flat surface. The free end of the tail cap 122 may further include a centrally located recessed portion in which the button 120 is visible and accessible and which still allows the tail cap to stand and be supported by the legs, ridges, or outer edges.

Figures 13A, 13B:
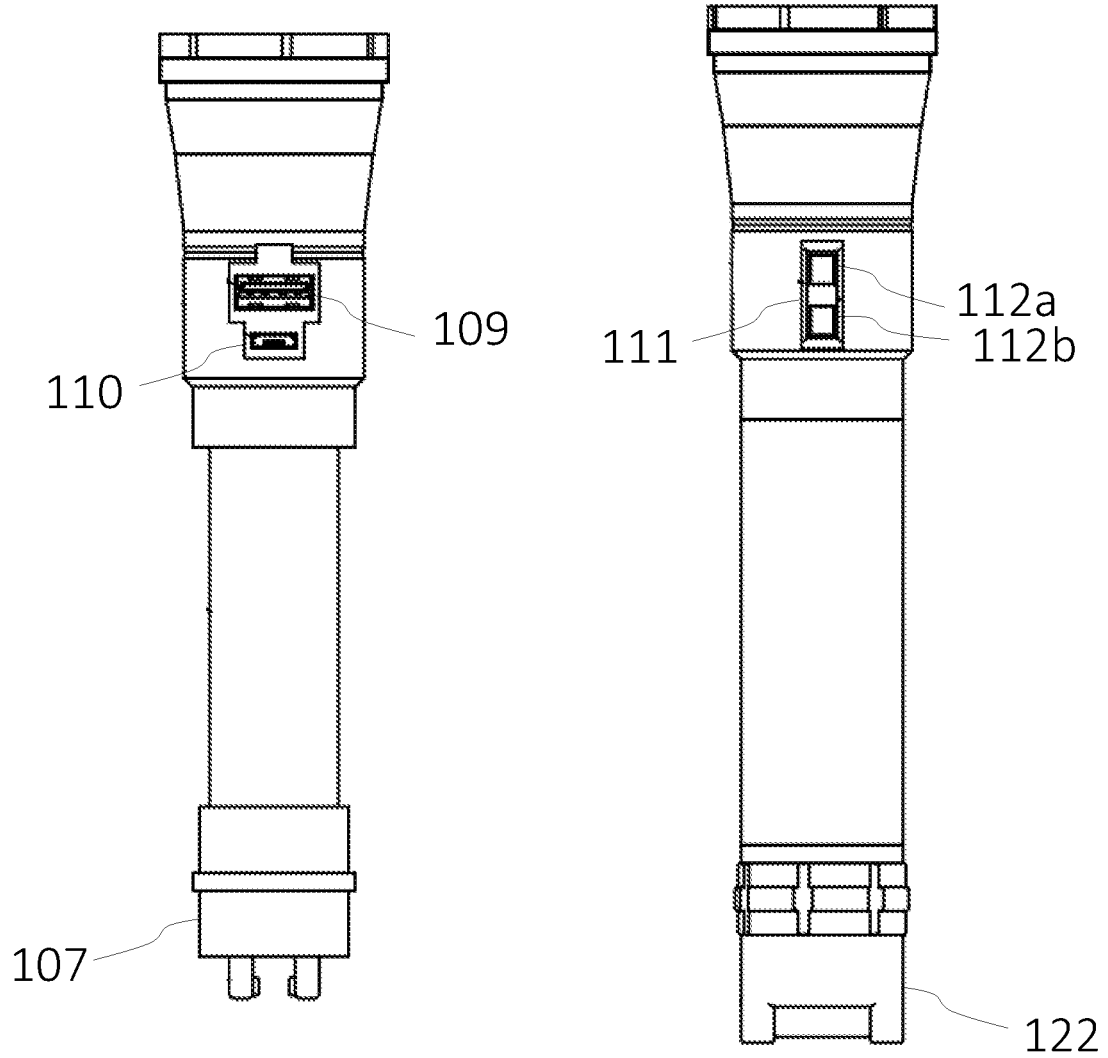
FIG. 13a illustrates a side view of the light emitting device according to an example of principles described herein.
FIG. 13b illustrates a side view of the light emitting device according to an example of principles described herein.

Turning to FIGS. 13a and 13b, side views of the exemplary device 100 are shown with operative components 112a and 112b along with indicator light 111 shown on one side of the device 100 with USB input port 109 and output port 110 shown on an opposite facing side. The device in FIG. 13a is shown without a tailcap so that the arc lighter is exposed. The device in FIG. 13b is shown with the tailcap 122 secured over the arc lighter and to the device.

With components on both ends of the device, a path is needed to pass signals from one side of the battery to the other. A sleek and efficient approach includes connective circuit boards located at various locations throughout the device. The boards contact each other to pass current to the various components. In this manner, the device does not have to be a closed system with immovable components that require a permanent battery but rather be a device that can be disassembled and have a removable battery (e.g., reusable, rechargeable, etc.). Circuits to contact each other are re-established when the device is reassembled and thus electrical connection is also re-established.

Figure 14:
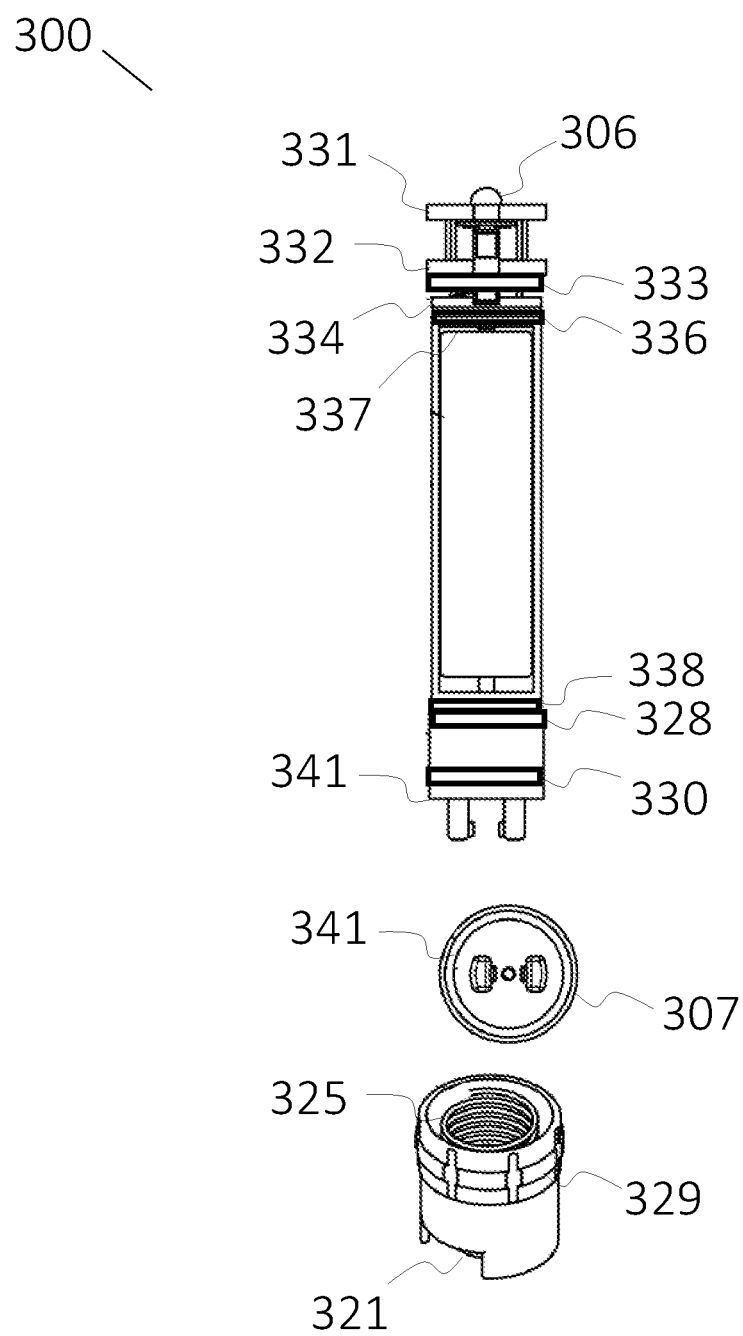
FIG. 14 illustrates an exploded view of the light emitting device according to an example of principles described herein.

Turning to FIG. 14, an exploded view of device 300 is shown that includes exemplary circuit boards spaced throughout the device. Example boards include at least one of a light driver board 331, LED driver board 332, USB input board 333, USB output board 334, microcontroller board 336, top battery board 337, bottom battery board 338, arc lighter board 328, button board 329, tail cap board 330, and tail cap button 321. Each of the boards may be located near the respective components, so for example, the light driver board 331 is at or near the light source 306. The USB input board 333 is at or near the USB input port, the USB output board 334 is at or near the USB output port, the top battery board 337 is at or near the top of the battery sleeve, the bottom battery board 338 is at or near the bottom of the battery sleeve, the arc lighter board 328 is at or near the top of the arc lighter 307, the button board 341 is at the bottom of the arc lighter and near at least one button. Fewer boards or additional boards may be used. For example, each button may have its own board.

Each board comprises an annular disc and componentry that fits within the device 300. A conductive path is provided by a conductive portion of the board. The arc lighter 307 is shown on its front side to show the front of the button board 341 and its conductive path arising from a conductive ring around the annular edges of the button board 341. The other boards have similar paths arising from conductive rings. The rings may be located at annular edges or may be located along any circular path around the board.

A coil 325 is located within the tail cap 322 and is used to exert force to hold the battery module in place.

Figures 15A, 15B, 15C:
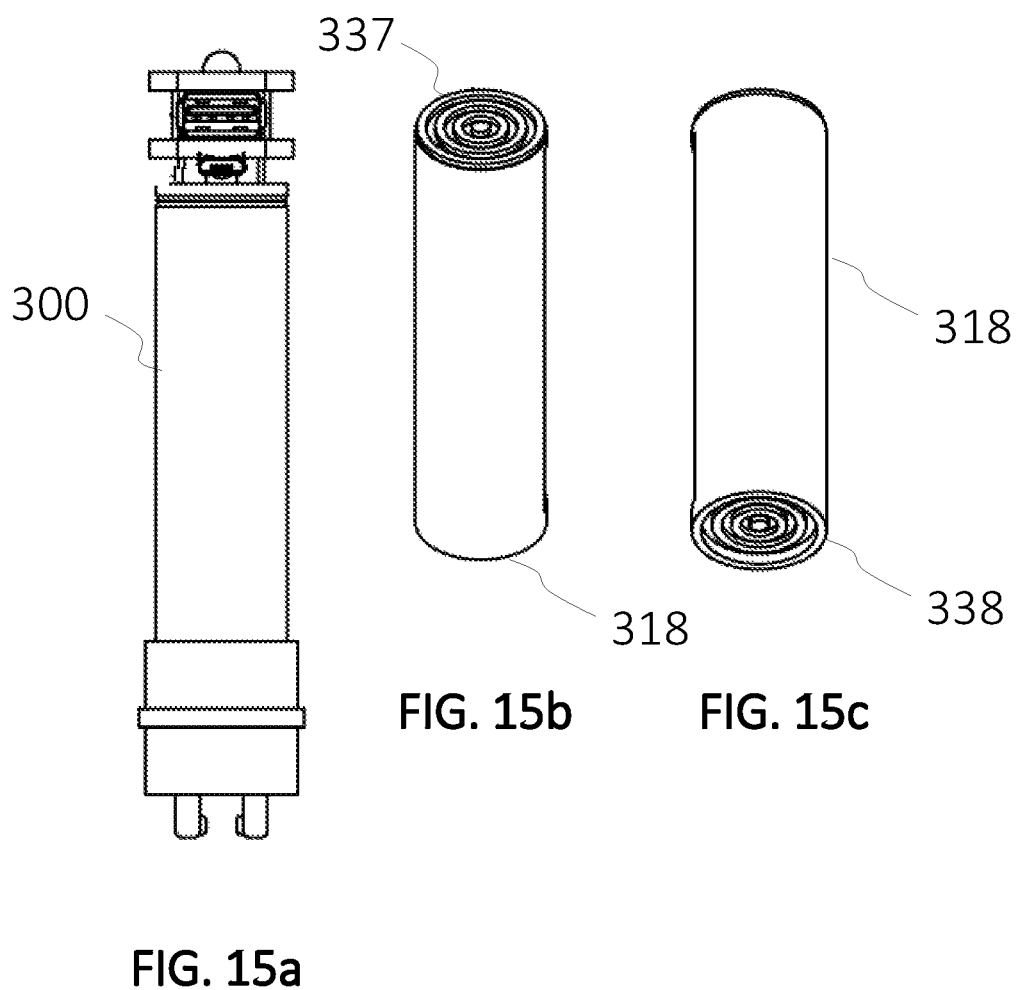
FIG. 15a illustrates a side view of a portion of the light emitting device according to an example of principles described herein.
FIG. 15b illustrates a perspective view of a battery module according to an example of principles described herein.
FIG. 15c illustrates a perspective view of a battery module according to an example of principles described herein.

Turning to FIG. 15a, a side view of the device 300 is shown and perspective views of the battery sleeve are shown in FIGS. 15b and 15c. The top battery board 337 is shown on top of the battery sleeve and the bottom battery board 338 is shown on the bottom of the battery sleeve. Circuits are connected through the top and bottom boards of the battery sleeve.

Figure 16:
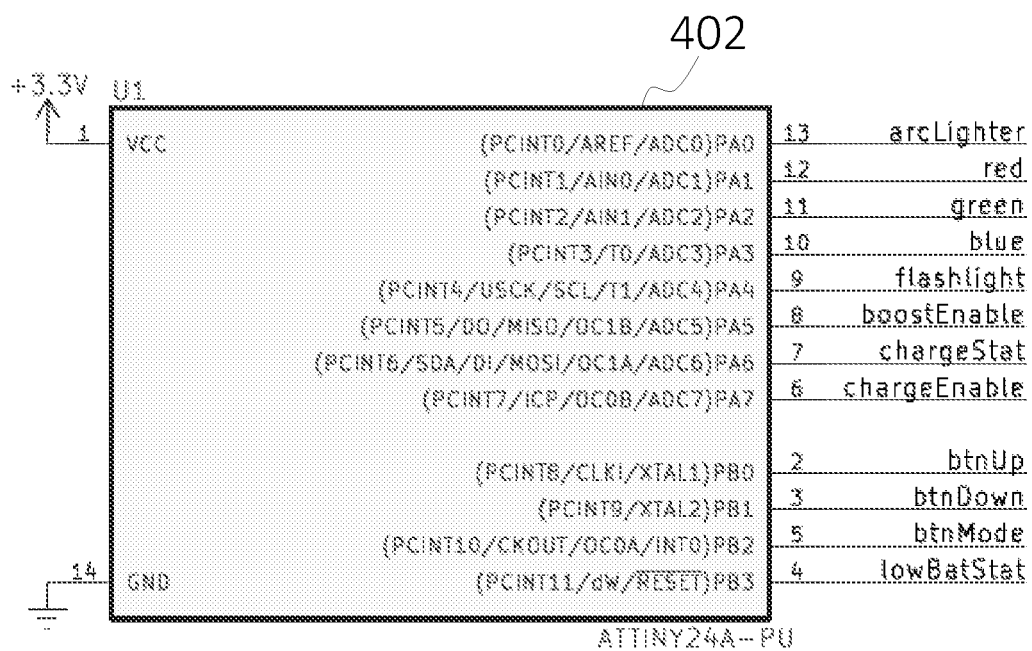
FIG. 16 illustrates a schematic diagram of a microcontroller of an example light emitting device according to an example of principles described herein.

Turning to FIG. 16, a schematic diagram of an example microcontroller 301 according to principles discussed herein is shown. The microcontroller 301 includes ground and a 3.3 V potential difference with signals communicated from the various components described herein. Signals may correspond to user actuation, automatic sensing, or predefined commands, for example.

Figure 17:
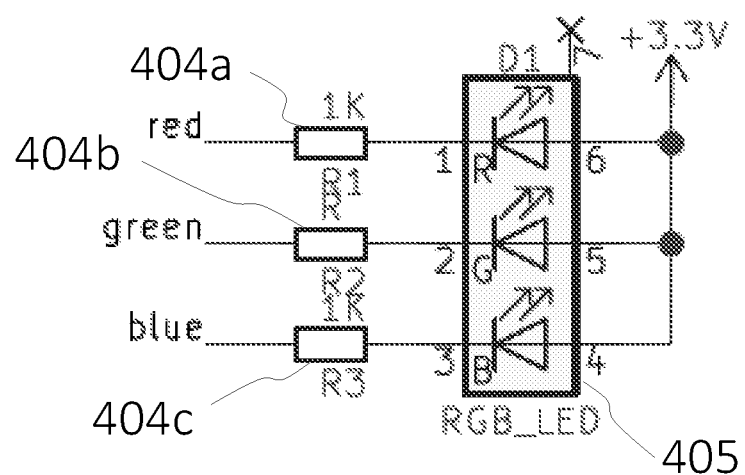
FIG. 17 illustrates a schematic diagram of an LED driver according to an example of principles described herein.

Turning to FIG. 17, a schematic diagram of an RGB LED 305 is shown. The color of light is controlled by at least one or more resistors—resistor 304a for red light, resistor 304b for green light, and resistor 304c for blue light. The voltage shown is the same voltage for the microcontroller at 3.3 V. The RGB LED 305 is used to light up according to modes and submodes discussed herein.

Figure 18:
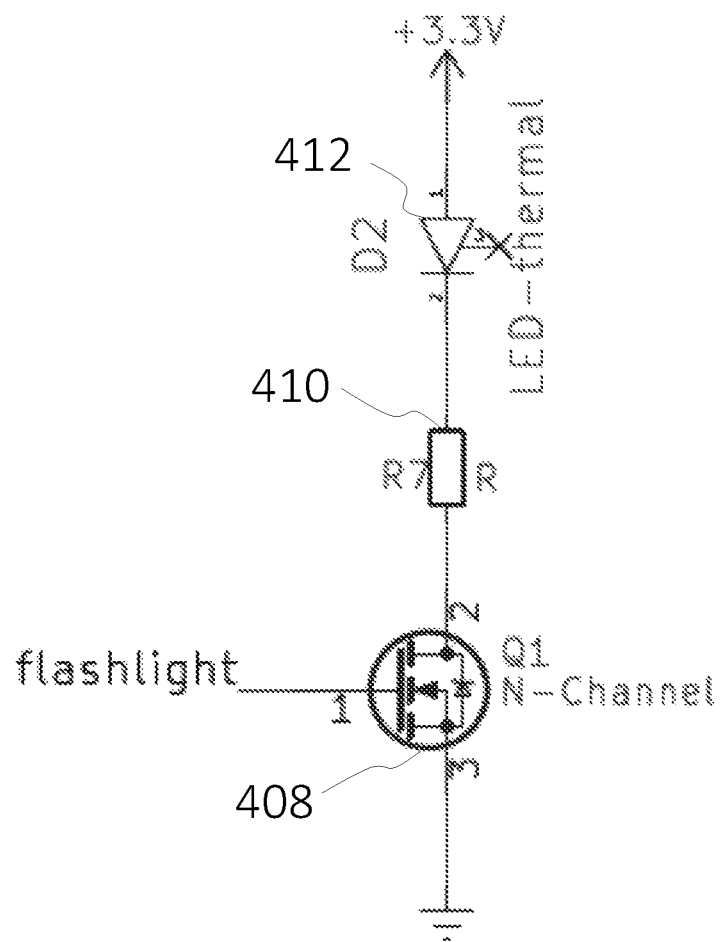
FIG. 18 illustrates a schematic diagram of a light source according to an example of principles described herein.

Turning to FIG. 18, an example schematic diagram for the flashlight LED is shown according to principles described herein. The diagram includes a light source, such as a light-emitting LED 412 shown. An example voltage of 3.3V is applied over the LED 412, resistor 410, and mosfet 408. The mosfet 408 is switched on and off by the microcontroller 301 to control light emission of the LED 412.

Figure 19:
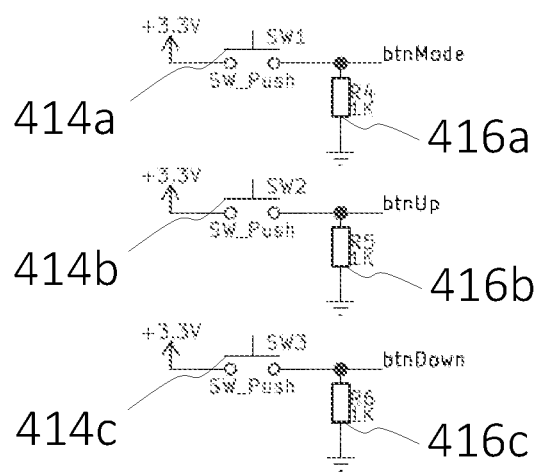
FIG. 19 illustrates a schematic diagram of buttons of an example light emitting device according to an example of principles described herein.

Turning to FIG. 19, a set of example schematic diagrams of respective buttons 414a, 414b, and 414c are shown according to principles described herein. Each diagram includes a 3.3V applied over a button 414a, 414b, and 414c, and respective resistor 416a, 416b, and 416c.

The device 100 is capable of having a variable voltage supply and can be powered in two ways—by battery or by an outside power source. For example, a power converter may take a 5 V (e.g., USB input port voltage) or a 3.7 V from a battery 120 and then output a constant 3.3 V to power the device 100.

At any given time, the microcontroller requires 3.3 V to run code. Under normal operation, the converter always has 3.3 V, but the converter input changes depending on the use. Under normal conditions, the battery voltage is used with 3.3 V and can power all functionality. The arc lighter is run by a 3.3 V which is always constant whether the converter is powered by the battery or an outside power source.

When the battery gets low and the device is plugged into an outlet via the USB input port, a 5 V ends up being the potential that is used to charge the battery. The battery is the main power source, but while the device 100 is charging through the USB input port, the device 100 cannot pull voltage from the battery. In other words, the microcontroller cannot be powered. If the battery gets low, the device 100 can be plugged into an outside power source (electrical outlet, external power supply, external battery) through the USB input port to be charged. While the device is charging, the device may also pull power from the outside power source to function (e.g., emit light, use arc lighter, etc.).

Figure 20:
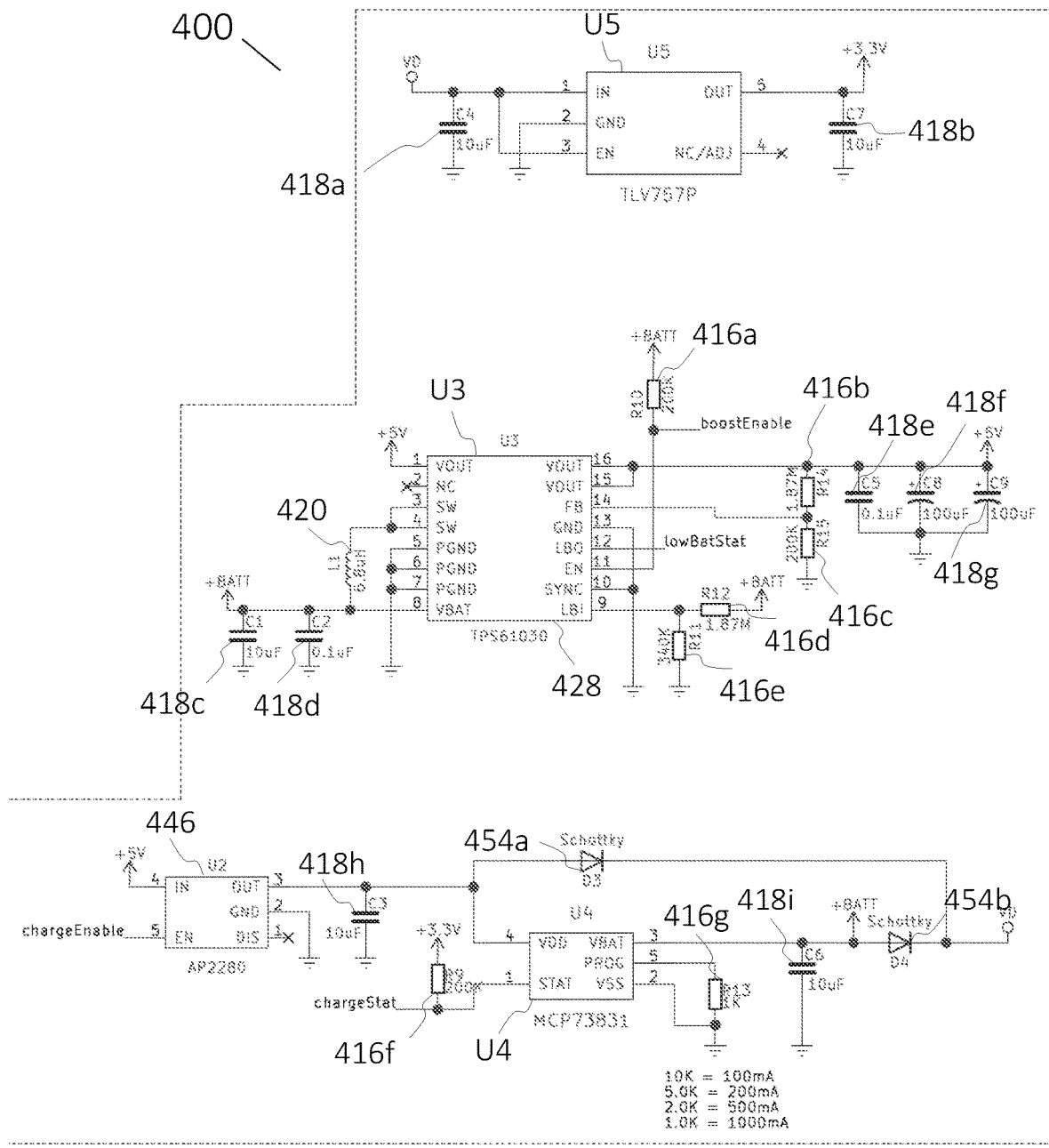
FIG. 20 illustrates a schematic diagram of a power supply for an example light emitting device according to an example of principles described herein.

Turning to FIG. 20, an example schematic diagram for a power bank circuit U5 that regulates power from the battery and from an external power supply is shown according to principles described herein. Power bank circuit U5 takes either 5 V from a USB input port 109 in any voltage from 0.5 V to 6 V from a USB input port 109 (see FIG. 5) and outputs a constant 3.3 V signal. Capacitors 418a and 418b are for noise filtering purposes. LED indicator light 111 (see FIG. 11) may be programmed to flash while the battery 120 (see FIG. 12) is being powered.

A boost converter circuit U3 takes a voltage and boosts it to 5 V for charging external devices through a connection to the USB output port 110. Capacitors 418c, 418d, 418e, 418f, and 418g filter out noise. Resistors 416a, 416b, and 416c divide the voltage and direct it back to the boost converter 428 which regulates output voltage to be a constant 5 V when being used. Raising and lowering the output voltage is controlled by the boost converter 428 and resistor 416a functions. Voltage provided by the battery across resistors 416*d* and 416*e* gives feedback to the boost converter 428 and makes the output voltage constant.

A battery charging circuit U4 includes an on/off switch 446 that is actuated by the chargeEnable signal. When power is plugged into the USB input port, a 5 V potential across the battery charging circuit U4 charges the battery 120. Resistor 416*g* regulates the voltage, for example, to provide 1000 mA. Diodes 454*a* and 454*b* separate a 5 V potential so that the battery 120 cannot output current while power is being delivered through the USB input port 109. Capacitors 418*h* and 418*i* filter out noise.

If an external power supply is plugged into the USB input port 109, the voltage VD will be 5V. Otherwise, the voltage will be the battery voltage. The start pin on the charging circuit signals whether the battery 120 is charging the charging circuit or not.

Figure 21:
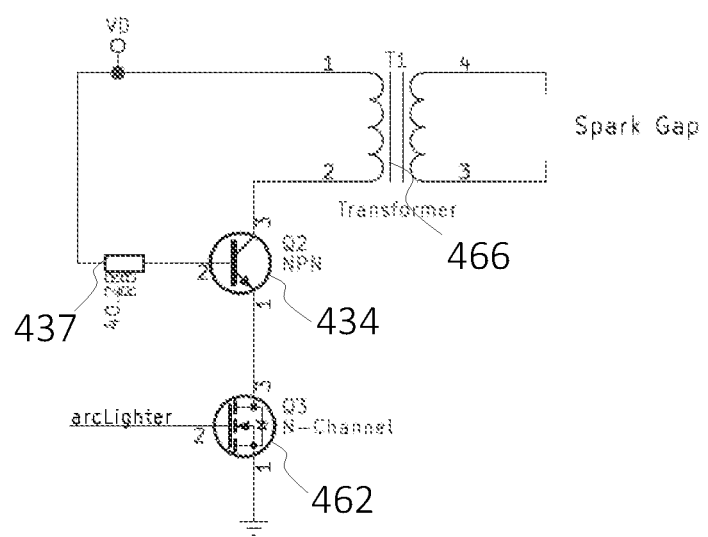
FIG. 21 illustrates a schematic diagram of an arc lighter of an example light emitting device according to an example of principles described herein.

Turning to FIG. 21, an example arc lighter circuit diagram is shown according to principles described herein. The circuit is controlled by mosfet 462 and resistor 437. An oscillating signal from the power bank circuit 400 or another high frequency source turns transistor NPN 434 on which causes current to flow across the transformer 466. The transformer 466 converts voltage from 3 V to 10K V which causes a breakdown in air to cause a spark.

Figure 22:
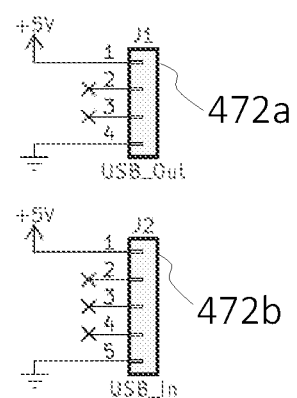
FIG. 22 illustrates a schematic diagram of a USB of an example light emitting device according to an example of principles described herein.

Turning to FIG. 22, an example set of USB input and USB output circuit diagrams is shown according to principles described herein. The USB input 472*b* and USB output 472*a* use a standard connector and a 5 V potential.

Figure 23:
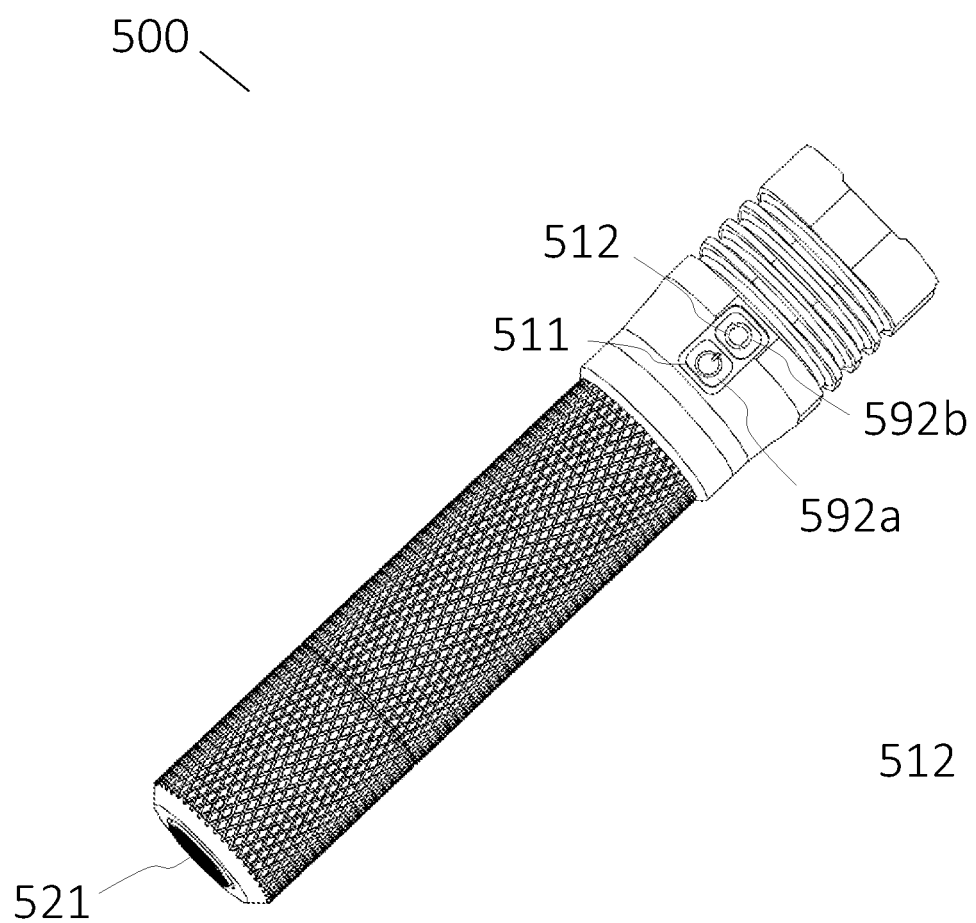
FIG. 23 illustrates a illustrates a perspective view of a light emitting device according to an example of principles described herein.

Other variations are anticipated. Variations of the device include the use of two buttons to control power and modes. For example, turning to FIG. 23, a variation of a light-emitting device 500 is shown that includes a mode/power button 512, a cycle button 511, and a tail cap button 521. The device may be turned on and off by activating (e.g. pressing, holding down, pushing repeatedly, etc.) the mode/power button 512 or the tail cap button 521. Alternatively, the device may be turned on and off by holding down the respective button while the cycle button 511 is pushed. The mode/power button 512 and cycle button 511 each include a respective indicator light 592*b* and 592*a* that lights up according to modes and sub-modes being used.

For the mode/power button 512, a single push does nothing when the device 500 is turned off. When the device is turned on, however, a single push activates or changes one of the various modes, and is therefore used to cycle through the various modes of the device, such as Flashlight Mode 501, Arc Mode 507, USB Output Mode 510, Charging Mode 518, and Quick Light Mode 514.

Figure 24:
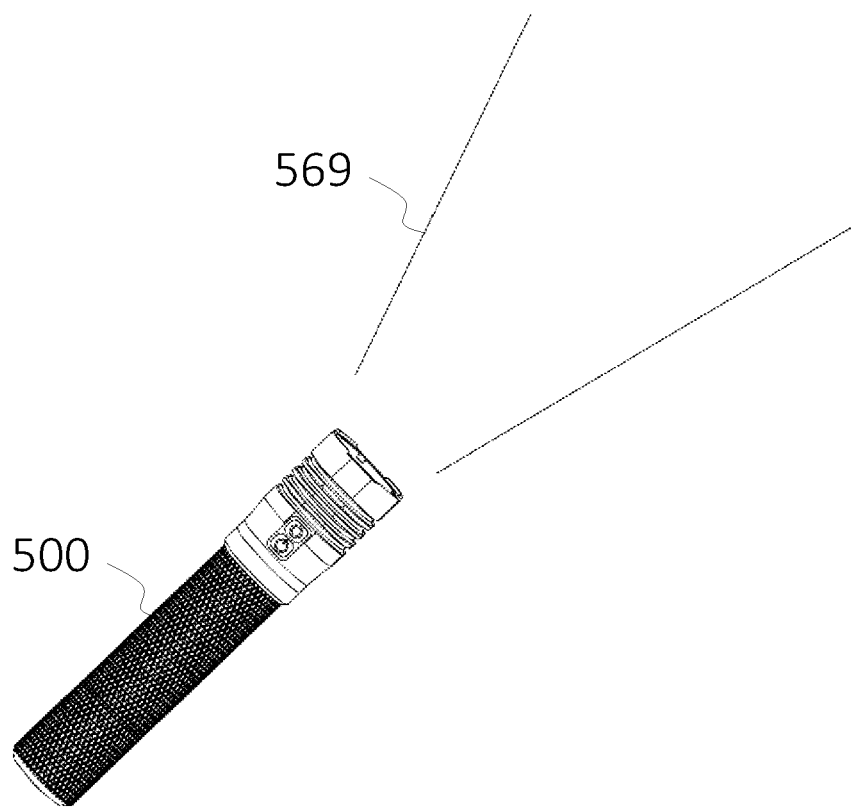
FIG. 24 illustrates a perspective view of a light emitting device according to an example of principles described herein.
Figure 28:
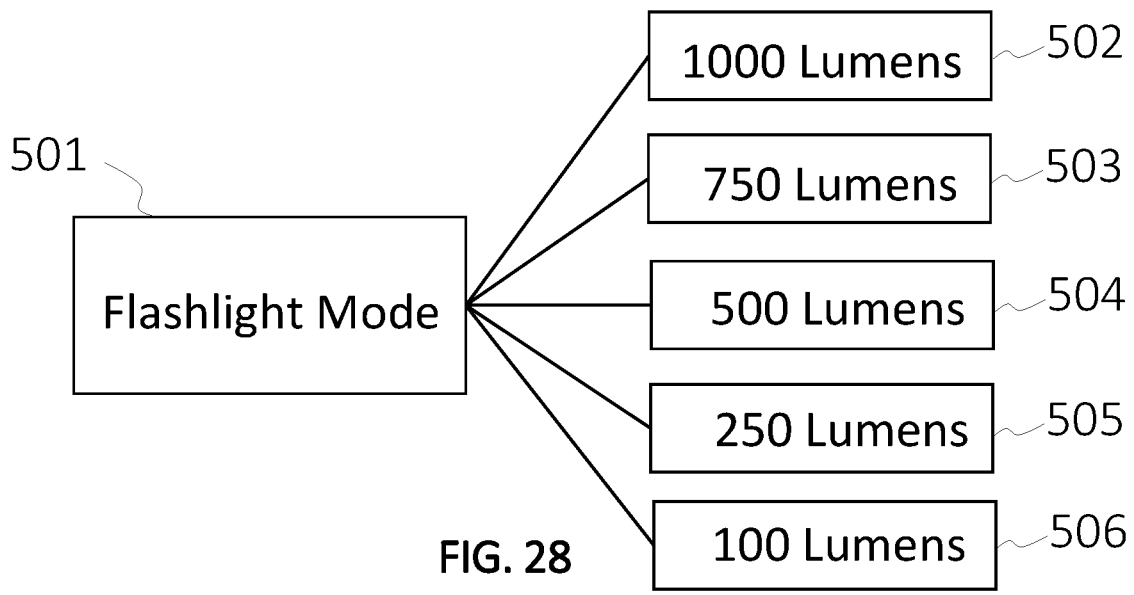
FIG. 28 illustrates an example diagram of features according to an example of principles described herein.

The cycle button 511 allows the device 500 to cycle through sub-modes of the various modes. In FIG. 24, the device 500 is shown emitting light 569 in a Flashlight Mode 501 (see FIG. 28). One or more of the indicator lights 592*b* and 592*a* may light up to indicate the mode. For instance, there may be no light when the Flashlight Mode 501 is being used.

A single push (e.g., 0-1 second interval, etc.) of the cycle button 512 may be used each time desired to change the brightness of the lumen output. Sub-modes that are cycled through include 1000 lumens 502, 750 lumens 503, 250 lumens 505, and 100 lumens 506. A Quick Light Mode is depicted in FIG. 32 and a press and hold push (e.g., 1-2 second interval, etc.) may be used to activate the Quick Light Mode with its various sub-modes of certain lighting types, such as Strobe 515, S.O.S. 516, and Beacon 517.

Figure 25:
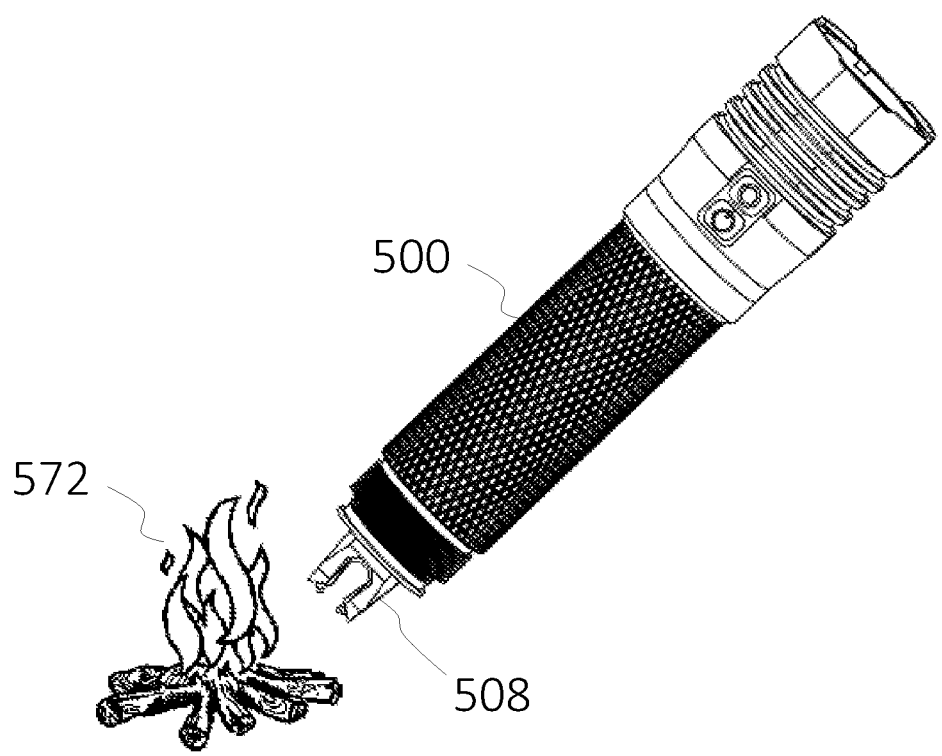
FIG. 25 illustrates a perspective view of a light emitting device according to an example of principles described herein.
Figure 29:
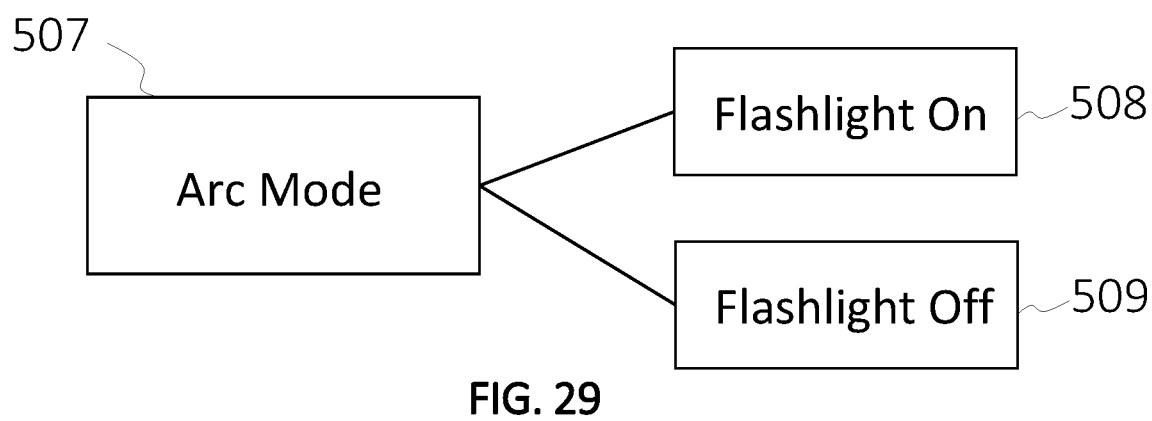
FIG. 29 illustrates an example diagram of features according to an example of principles described herein.

In FIG. 25, the device 500 is shown sparking a fire 572 with its arc prongs 508 in Arc Mode 207 (see FIG. 29). Sub-modes Flashlight On 508 and Flashlight Off 509 may be used to allow the arc activity with the light (508) and without the light (509) as used by the power mode button 512. While the sub-modes Flashlight On 508 and Flashlight Off 509 are shown in FIG. 29 with respect to the Arc Mode 207, they apply to various other modes described herein.

During Arc Mode, a press and hold push (e.g. pressing a button for 0-1 second, 1-2 seconds, 1-3 seconds, etc.) of the cycle button 512 may be used to activate the arc prongs 508 for a time during which the cycle button 512 is pressed. An auto shut-off time interval of the arc lighter after a max activation interval (e.g., 30 seconds, 35 seconds, etc.) of being activated. After the max activation interval, the Arc Mode may be activated once again using the press and hold push of the cycle button 512.

Figure 26:
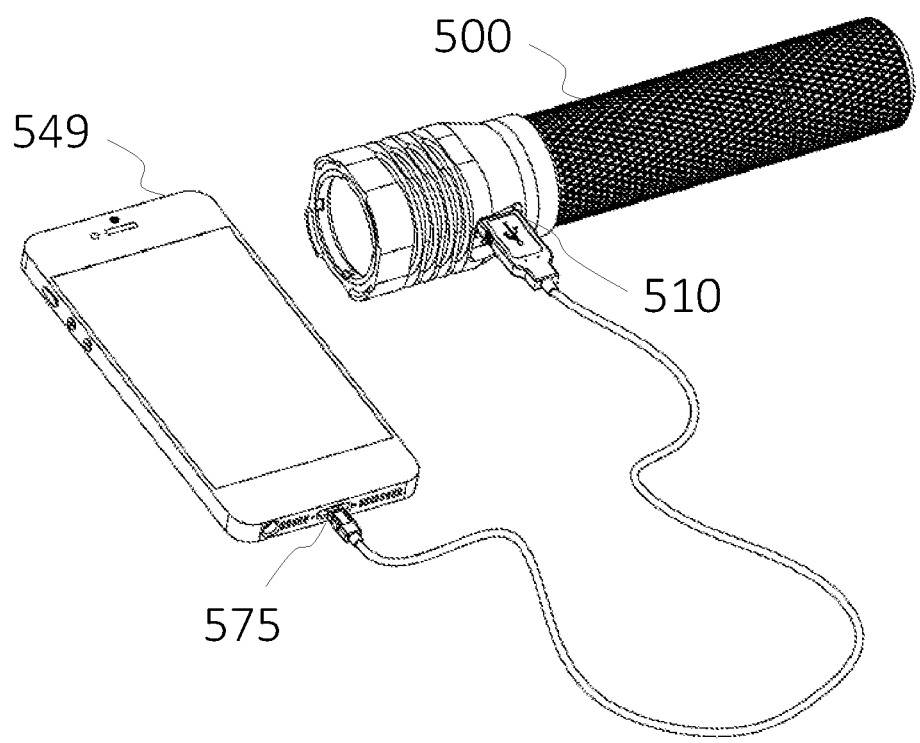
FIG. 26 illustrates a perspective view of a light emitting device according to an example of principles described herein.
Figure 30:
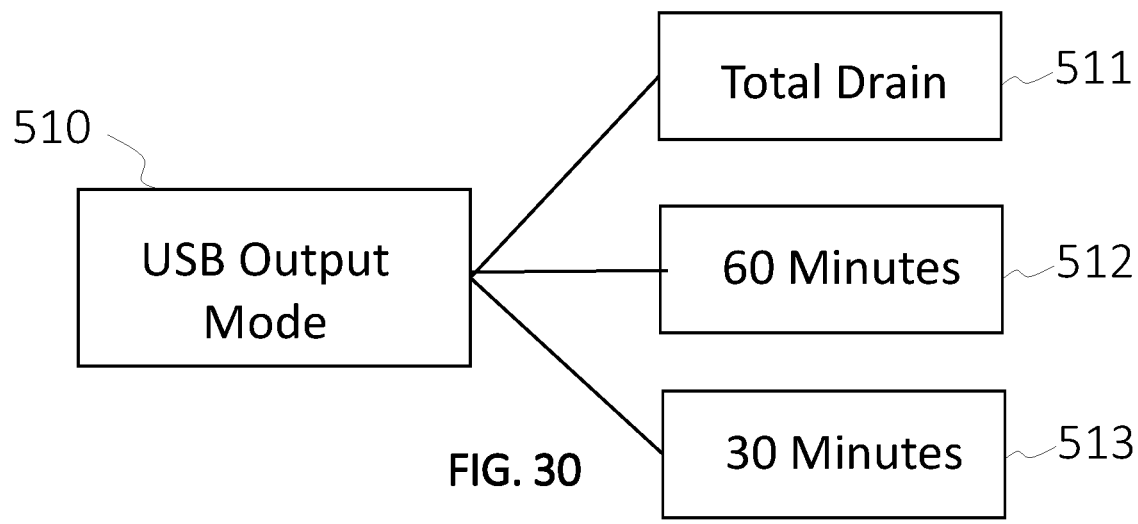
FIG. 30 illustrates an example diagram of features according to an example of principles described herein.

In FIG. 26, the device 500 is shown charging a mobile device 549 with USB output port 510 and charging cable 575 in USB Output Mode 210 (see FIG. 30) as selected by power mode button 512. Other external electronic devices may be charged as well. Single pushes (e.g. 0-1 second interval, etc.) on the cycle button 512 cycle through sub-mode periods of charging time, such as a total drain time (e.g., default sub-mode, etc.) 511, 60 minutes 512 of charge time, and 30 minutes 513 of charge time. Other charging times are anticipated.

One or more indicator lights 592*a* and 592*b* indicate the state of charging. For example, a solid blue light may be lit while the external device is being charged. A red light may be pulsed when the battery of the device 500 is low to suggest to a user that the mobile device 549 should be disconnected to preserve battery life for the device 500.

A press and hold push (e.g., 1-2 second interval) of the cycle button 592*b* may be used to make one or more indicator lights 592*a* and 592*b* indicate the current battery percentage level. Lights may pulse or flash or stay steady. The lights may flash a number of times, for example, 1 flash to indicate 10%, 2 flashes to indicate 20%, 3 flashes to indicate 30%, etc. Alternatively, the lights may have a lumen strength, such as 1000 lumens to indicate 100%, 900 lumens to indicate 90%, 800 lumens to indicate 80%, etc.

Figure 27:
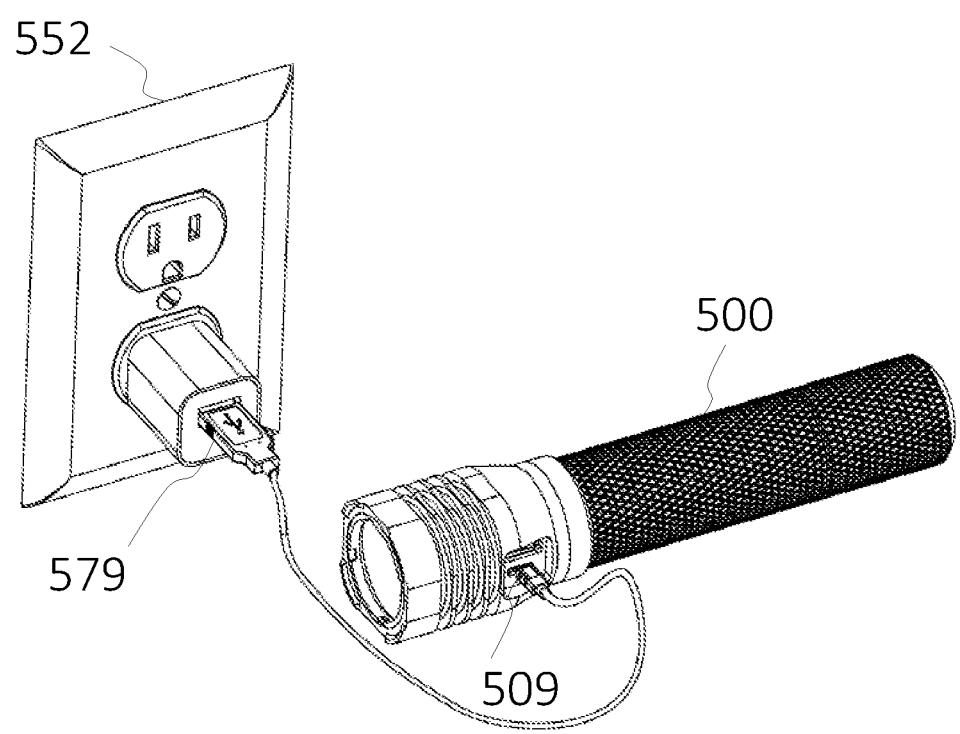
FIG. 27 illustrates a perspective view of a light emitting device according to an example of principles described herein.

In FIG. 27, the device 500 itself is shown being charged through a USB input port 509 while the device is plugged into an electrical outlet 552. Some modes may be automatic, for example, the Charging Mode 518 may be an automatic mode which is activated as soon as the device 500 is plugged into an electrical outlet or other charging source. The mode may be inaccessible to the user through buttons or other operative means associated with the device. One or more indicator lights 592*a* and 592*b* may be used to show the state of the device 500. For example, a light pulsing green indicates that the device is charging. A solid green light indicates that the device 500 is fully charged.

The tail cap button 521 may be used to activate the flashlight despite whatever mode and sub-mode is currently in place. For example, a single push may be used to turn the flashlight on momentarily. A press and hold push may be used to activate the flashlight as long as the tail cap button 521 is being pushed. A double push may be used to make the flashlight stay on until the tail cap button 521 is pushed again. The light brightness of the flashlight as activated by the tail cap button 521 is dictated by memory. For example, the light brightness may be what was used in the last sub-mode of the Flashlight mode. Alternatively, the light brightness may be an automatic light brightness that is not changeable.

Figure 33:
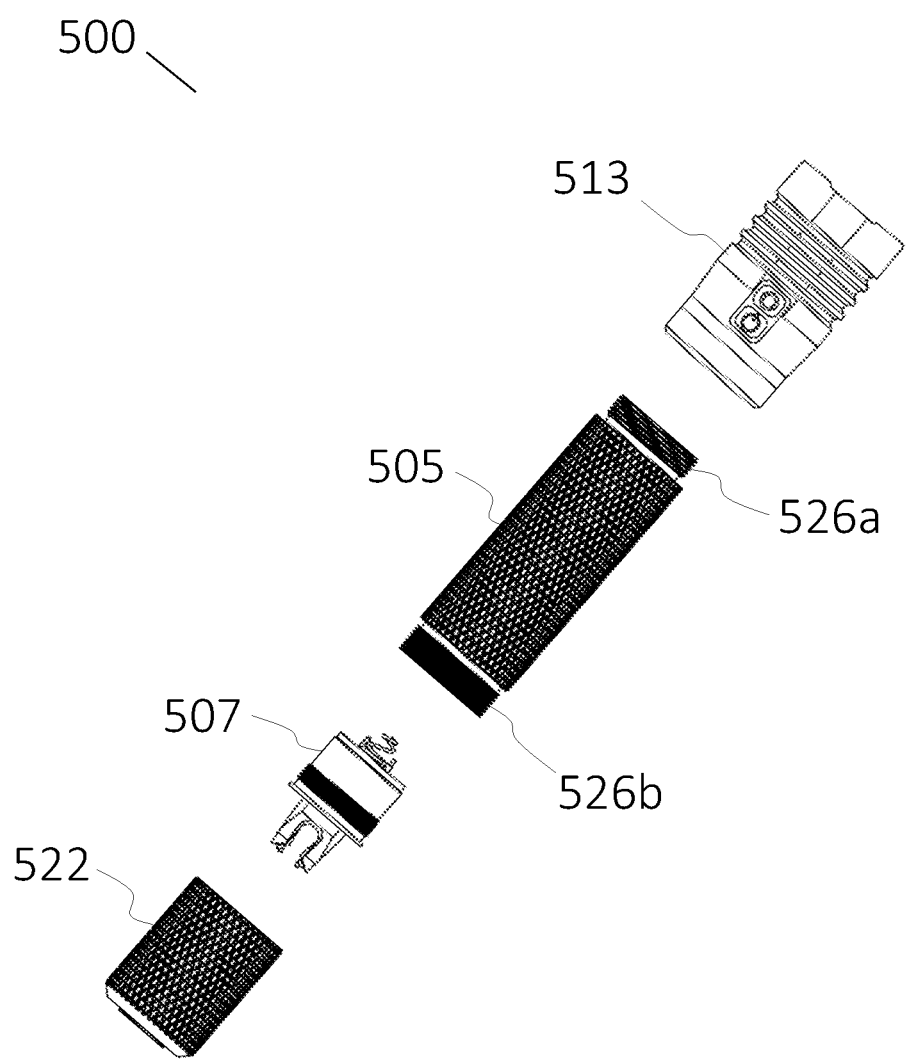
FIG. 33 illustrates an exploded view of the light emitting device according to an example of principles described herein.

FIG. 33 illustrates an exploded view of the device 500 including the head 513, handle 505, arc lighter 507, and tail cap 522. The handle 505 is shown having threaded ends 526a and 526b that are used to attached with a screw fit to respective adjacent head 513 and tail cap 522, with the arc lighter 507 encased within the tail cap 522. Alternatively, the handle 505 attaches to edges or sides of the arc lighter 507. Instead of a screw fit, a friction fit or other fit is also anticipated to attach various components.

Figures 34A, 34B:
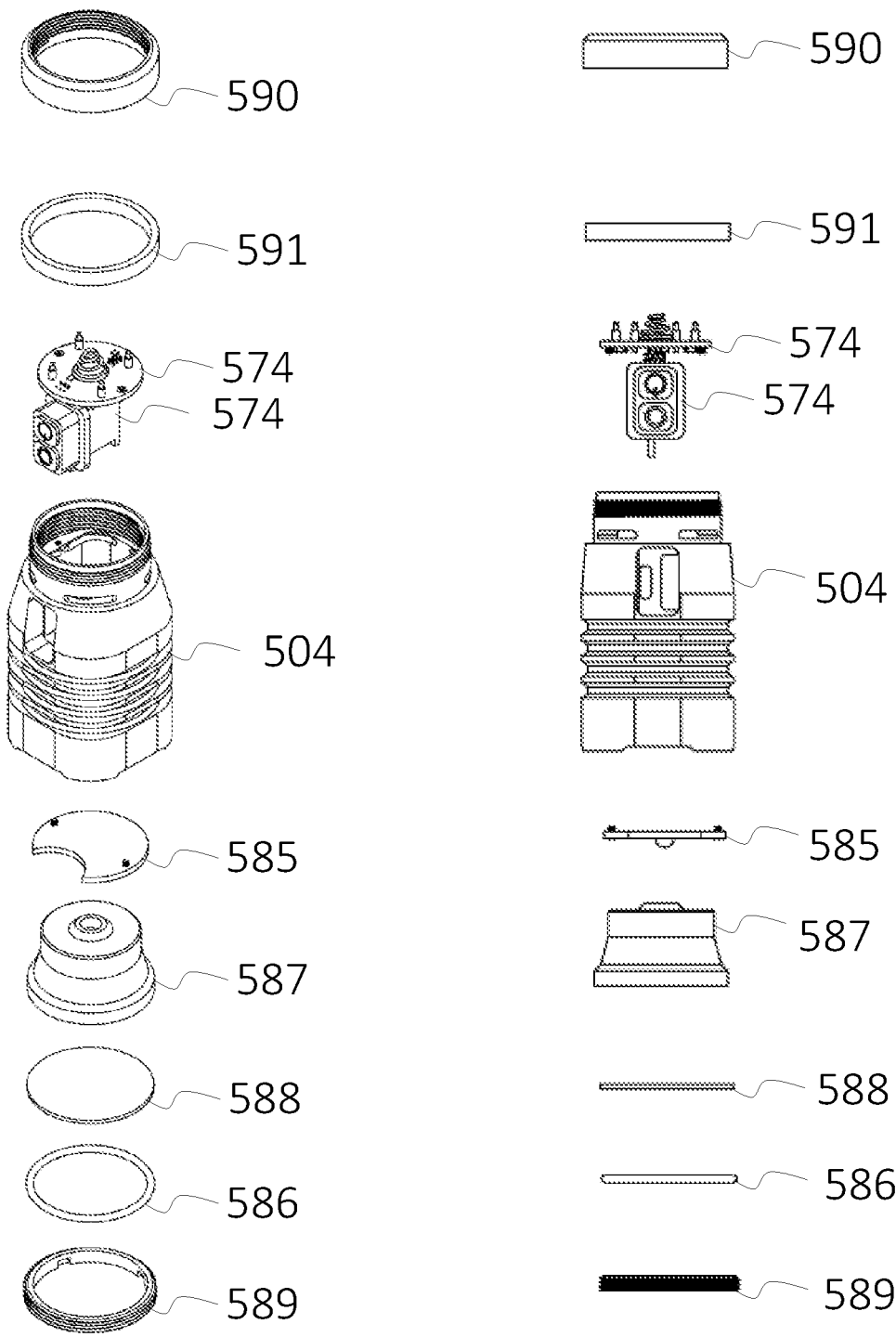
FIG. 34a illustrates an exploded view of a portion of the light emitting device according to an example of principles described herein.
FIG. 34b illustrates an exploded view of a portion of the light emitting device according to an example of principles described herein.

FIG. 34a and FIG. 34b illustrate exploded views of the head, including polycarbonate ring 591, aluminum ring 590, reflector 587, window 588, window retainer cap 589, LED circuit board components 585, head casing 504, silicone O ring 586, and power head circuit board components 574. The power head circuit board components 574 include one or more of the various circuits and components described herein or similar circuits and components including, for example, one or more of a microcontroller 123, light driver board 331, LED driver board 332, USB input port 109, USB output port 110, LED indicator light 111, button board 335, microcontroller board 336, top battery board, 337, bottom battery board 338, arc board on top of arc lighter 339, arc lighter board on bottom of arc lighter 340, and tail cap board 341. The LED circuit board components 585 include one or more of the various circuits described herein or similar circuits and components including, for example, one or more of the LED driver board 332 and LED indicator light 111.

The head casing 504 includes threads to attach to the battery sleeve 505. The head casing 504 further includes an interior space in which the LED circuit board components 585 and power head circuit board components 574 are placed. The aluminum ring 590 includes a rigid annular ring that is secured around outer edges of the head casing 504 at one end to hold the LED circuit board components 585. Polycarbonate ring 591, or another type of ring, may be used as part of the fitting between the aluminum ring 590 and head casing 504 to ensure a tight fit.

Reflector 587 and window 588 are components to direct light from one or more LEDs and are placed adjacent to the LED circuit board components 585. Retainer cap 589 is a ring secured to the end of the head casing 504 to secure the aforementioned components within the head casing 504 with a screw fit, friction fit, or other fit. Silicone O ring 586, or another type of ring, may be used as part of the fitting between the retainer cap 589 and head casing 504 to ensure a tight fit.

Although materials are identified in association with various component names, other materials may be used. For example, the silicon ring may comprise various plastics, metal, or other materials.

FIGS. 35 and 36 illustrate the various components in the handle 505, including the battery 520, battery sleeve interior metal 577, battery sleeve interior plastic 578, battery sleeve exterior metal 579, and battery sleeve exterior plastic 580. The interior sleeves allow signals that allow the light emitting device to perform across the length of the device. The interior sleeves are arranged to provide insulative properties with metal layers alternating with plastic layers. For example, battery sleeve exterior metal 579 is layered between battery sleeve exterior plastic 580 and battery sleeve interior plastic 578. Also, battery sleeve interior metal 577 is layered between battery sleeve exterior plastic 578 and battery sleeve interior plastic 520. Various circuits attach to a respective battery sleeve exterior metal to establish an electrical connection across the battery sleeve.

Figures 37A, 37B:
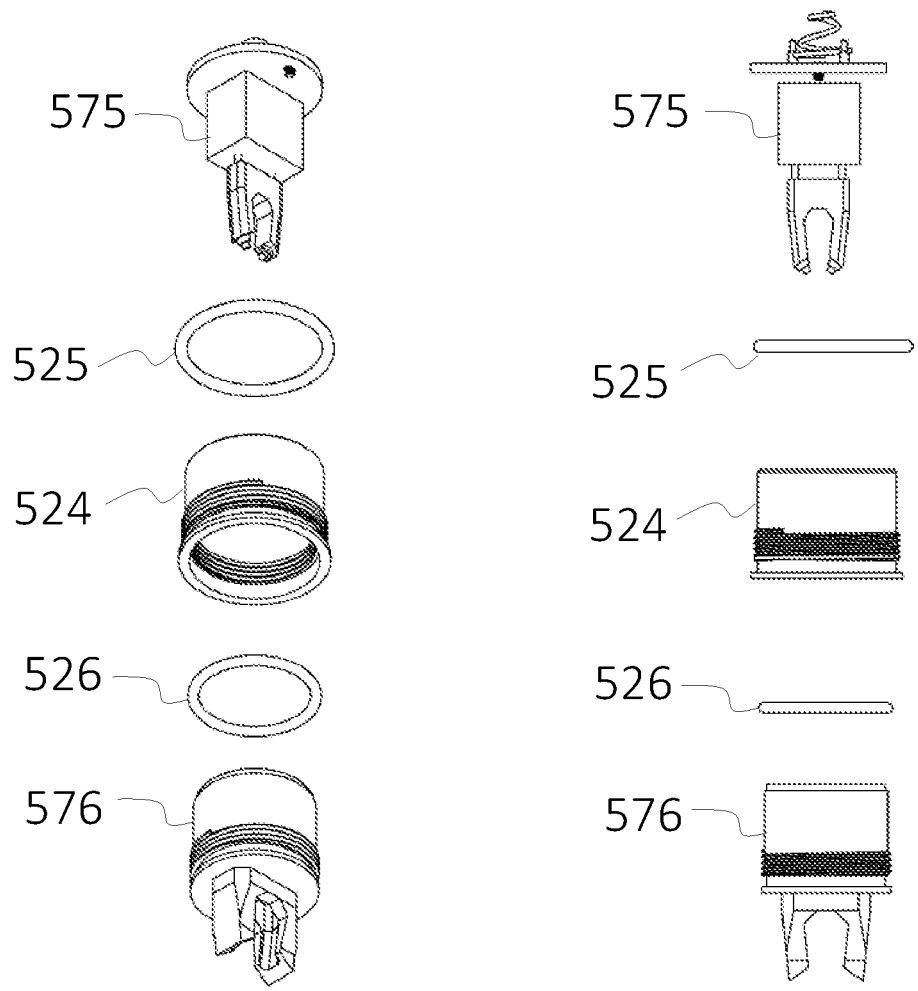
FIG. 37a illustrates an exploded view of a portion of the light emitting device according to an example of principles described herein.
FIG. 37b illustrates an exploded view of a portion of the light emitting device according to an example of principles described herein.

FIGS. 37a and 37b illustrate an exploded view of the arc lighter including O-rings 525 and 526, arc lighter 576, arc lighter circuit board components 575, and insulating sleeve 524. The arc lighter circuit board components 575 are inserted within a hollow of the insulating sleeve 524. O-ring 525 allows the edges of the arc lighter 576 to have a tight fit against the insulating sleeve 524 under a compression fit. On the other end of the insulating sleeve 524, the arc lighter 576 is inserted within an opening of the insulating sleeve 524. O-ring 526 allows the edges of the arc lighter 576 to have a tight fit against the insulating sleeve 524 under a compression fit. The arc lighter circuit board components 575 may include circuits discussed herein, the arc lighter board on top of arc lighter 339, and the arc lighter board on bottom of arc lighter 340 as well as other components discussed herein.

FIGS. 38a and 38b illustrate an exploded view of the tail cap button including tail cap circuit board components 581, washer 582, tail cap button 521, and tail cap 522. The tail cap circuit board components 581 include circuit components related to the circuits described herein. The tail cap circuit board components 581, washer 582, and tail cap button 521 are to be inserted within a hollow of the tail cap 522.

Figure 39A:
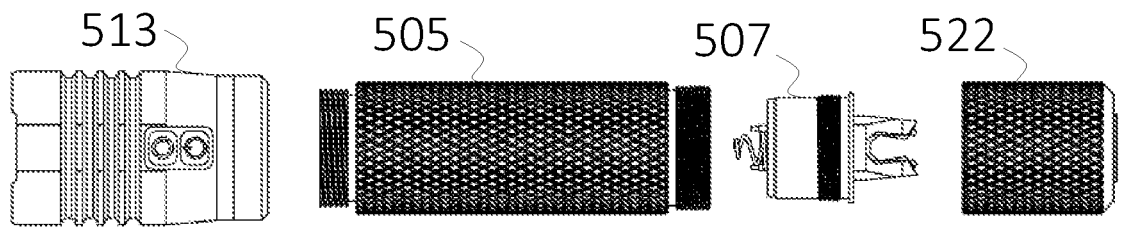
FIG. 39a illustrates an exploded view of a light emitting device according to an example of principles described herein.

FIG. 39a shows an exploded view of the device 500 for the head 513, handle 505, arc lighter 507, and tail cap 522. The circuitry for the various components will now be explained.

Figure 39B:
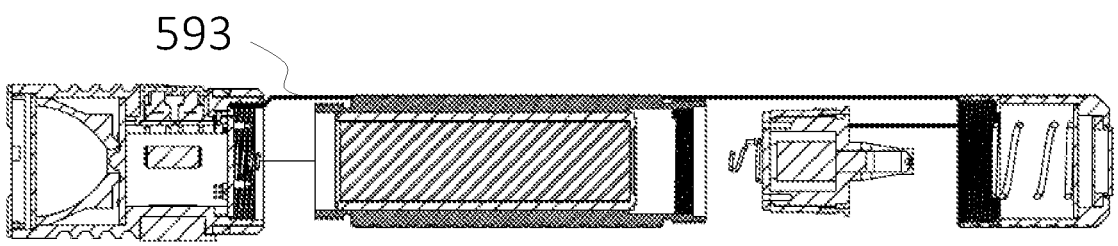
FIG. 39b illustrates exploded view of an electrical path within a light emitting device according to an example of principles described herein.

FIG. 39b shows a black line 593 that indicates a tail cap signal conducted through the body of the arc lighter 507, tail cap circuit board components 581 (e.g., tail cap spring), tail cap body, flashlight body, and flashlight circuit board components.

Figure 39C:
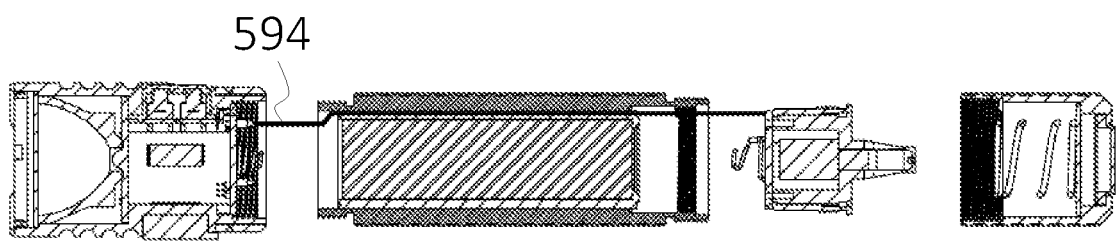
FIG. 39c illustrates exploded view of an electrical path within a light emitting device according to an example of principles described herein.

FIG. 39c shows a black line 594 that indicates a voltage at a positive battery terminal of the head circuit board components 574 (see FIG. 34b), arc-lighter circuit board components 575 (e.g., arc lighter copper ring 590) (see FIG. 37a), outer battery sleeve exterior metal 579 (see FIG. 36), and arc-lighter circuit board components (e.g. arc-lighter circuit board pogo pin).

Figure 39D:
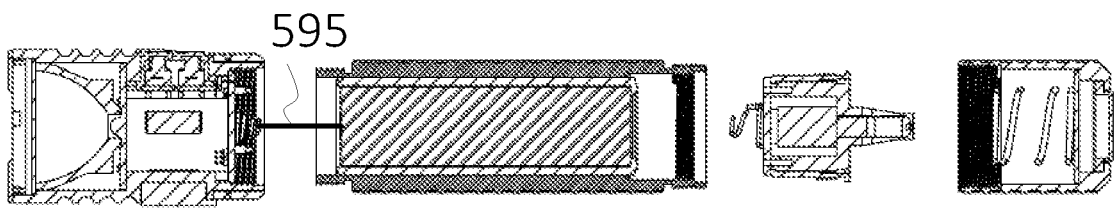
FIG. 39d illustrates exploded view of an electrical path within a light emitting device according to an example of principles described herein.

FIG. 39d shows a black line 595 that indicates a negative voltage at the head circuit board components 574 (see FIG. 34b) through the battery 520 (e.g. negative battery terminal) (see FIG. 34a).

Figure 39E:
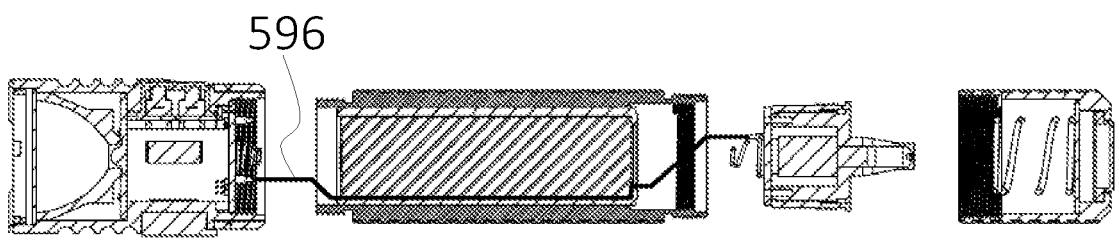
FIG. 39e illustrates exploded view of an electrical path within a light emitting device according to an example of principles described herein.

FIG. 39e shows a black line 596 that indicates an arc lighter signal conducted through the head circuit board components 574 (see FIG. 34b) (e.g. head circuit board pogo pin), inner battery sleeve interior metal 577 (see FIG. 36), and arc-lighter circuit board components 575 (e.g., arc-lighter circuit board pogo pin).

The circuitry is advantageous because it allows the device to be operable at both ends of the device and in between.

Figure 40A:
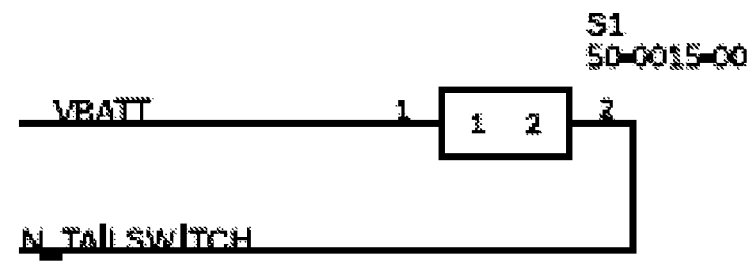
FIG. 40a illustrates an example diagram of features according to an example of principles described herein.
Figure 40B:
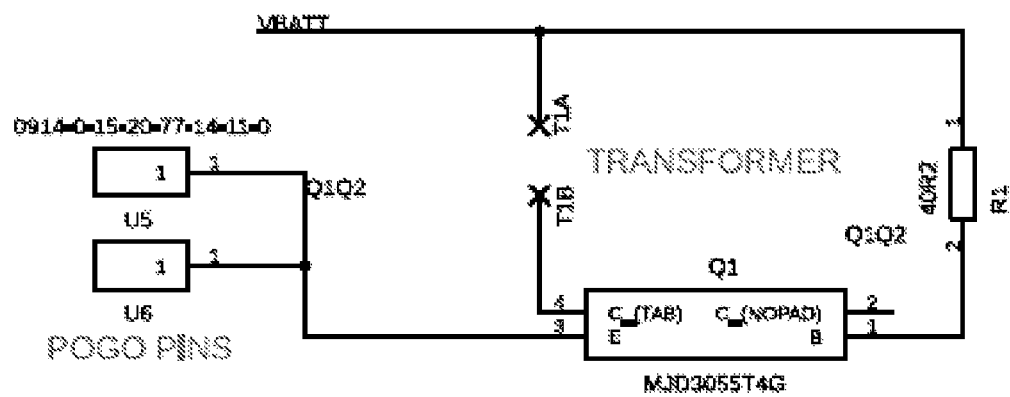
FIG. 40b illustrates an example diagram of features according to an example of principles described herein.
Figure 40C:
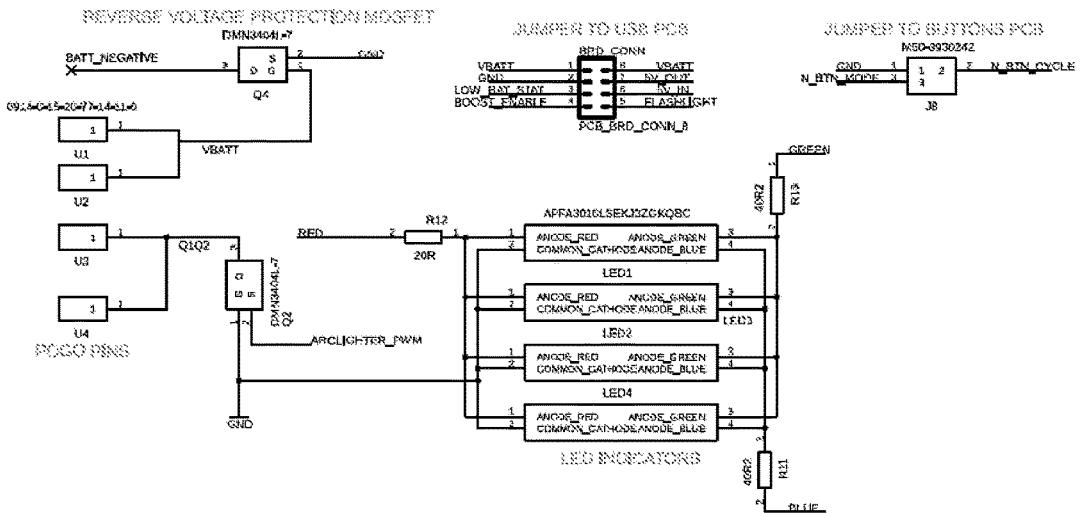
FIG. 40c illustrates an example diagram of features according to an example of principles described herein.
Figure 40D:
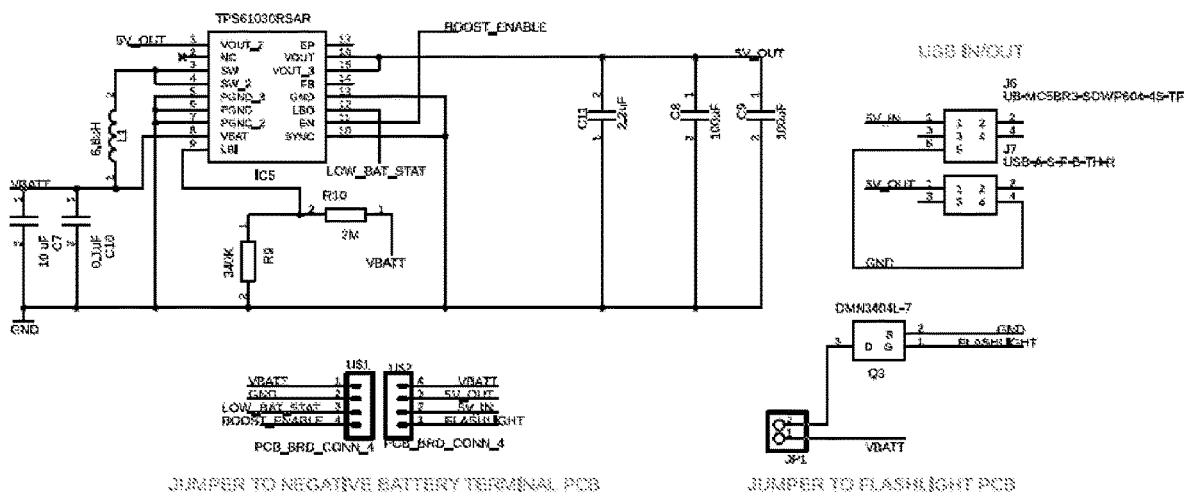
FIG. 40d illustrates an example diagram of features according to an example of principles described herein.
Figure 40E:
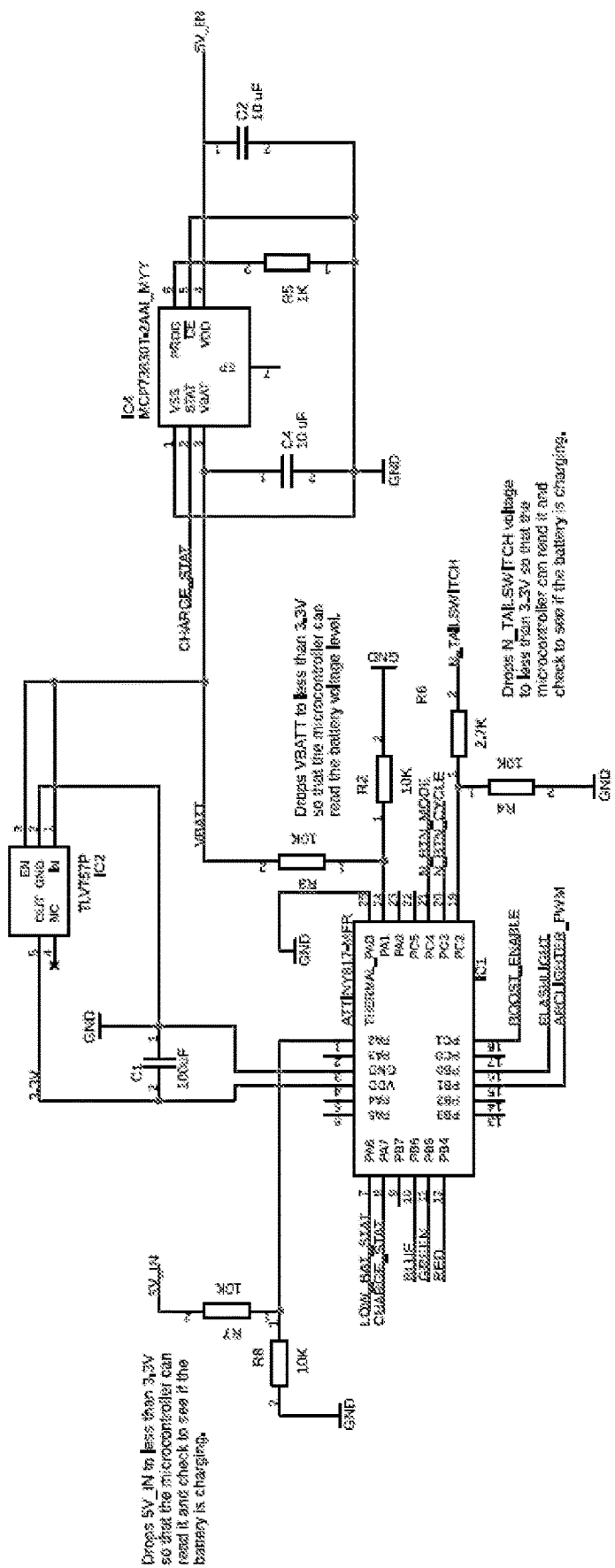
FIG. 40e illustrates an example diagram of features according to an example of principles described herein.
Figure 40F:
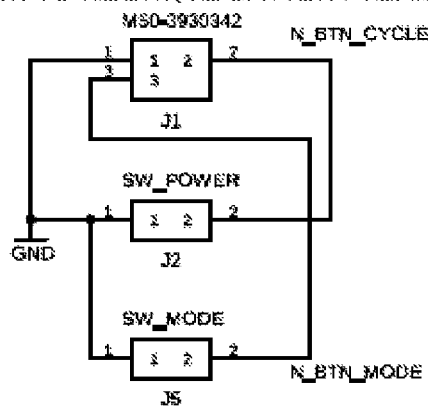
FIG. 40f illustrates an example diagram of features according to an example of principles described herein.
Figure 40G:
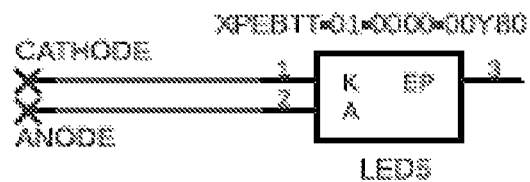
FIG. 40g illustrates an example diagram of features according to an example of principles described herein.

Various circuits and components may be used. For example, FIG. 40a illustrates an example schematic diagram for the tail switch. FIG. 40b illustrates an example schematic diagram for a positive battery terminal. FIG. 40c illustrates an example schematic diagram for a negative battery terminal. FIG. 40d illustrates an example schematic diagram for a USB input/output. FIG. 40e illustrates an example schematic diagram for a power bank circuit. FIG. 40f illustrates an example schematic diagram for an operative component, such as a button. FIG. 40g illustrates an example schematic diagram for the flashlight LED is shown according to principles described herein.

FIGS. 40a-40g are similar in design to preceding diagrams. In FIG. 40c, Q4 provides reversible protection mosfet to protect a user from putting the battery in backwards. Current flows is therefore allowed to flow in only one direction.

Also in FIG. 40c, LEDs 1, 2, 3, and 4 replace only having one LED. With four LEDs facing different directions, the light is more visible.

In FIG. 40e, additional resistors R7 and R8 are added as part of the circuit to indicate whether an external charging device is plugged into the USB input to charge the device. Particularly, R7 and R8 divide the 5V so that the microprocessor can process that an external charging device is plugged in.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A light-emitting device, comprising:
   a housing;
   a cavity within the housing to contain a microcontroller, a power bank, a battery, a light source within the housing to emit light away from the housing, the light source functionally connected to at least one of the battery and power bank;
   an arc lighter to create a spark, the arc lighter functionally connected to at least one of the battery and power bank, the light source and arc lighter on opposite sides of the cavity;
   a USB charging port to receive and communicate charge via the power bank and battery;
   at least one operative component on an opposite side of the cavity as the arc lighter for a user to selectively actuate at least one of a flashlight mode, an arc mode, and a USB charging mode; and
   a conductive path to establish electrical communication across the cavity from the battery and power bank to the light source, USB port, and the at least one operative component.

2. The light-emitting device of claim 1, further comprising a boost converter that boosts voltage for at least one of the USB charging port, the light source, and the arc lighter.

3. The light-emitting device of claim 1, the arc lighter further comprising a plurality of arc-lighter probes located at an end of the housing and that are removably covered by a tail cap.

4. The light-emitting device of claim 1, wherein the USB charging mode shuts off automatically after a period of time and thereby prevents draining the battery more than needed.

5. The light-emitting device of claim 1, further comprising a quick access mode that bypasses the flashlight mode, the arc mode, and the USB charging mode with at least one operative component.

6. The light-emitting device of claim 1, the modes comprising at least one or more sub-modes that enable different variations of the modes, the sub-modes to be selected with the at least one operative component.

7. The light-emitting device of claim 3, the flashlight mode comprising a sub-mode that comprises a level of brightness of the flashlight.

8. The light-emitting device of claim 3, the arc mode further comprising a sub-mode that prevents the flashlight from turning off when the arc-lighter probes are exposed.

9. The light-emitting device of claim 3, the USB charging mode further comprising a sub-mode that provides a particular period of time in which the USB port will charge before being automatically shut off.

10. The light-emitting device of claim 5, further comprising a quick access sub-mode that provides at least one of a strobe light, light flashing in morse code, or light flashing with an SOS signal.

11. The light-emitting device of claim 1, further comprising an indicator light that lights up according to which mode is selected.

12. The light-emitting device of claim 11, wherein the indicator light is integral with the at least one operative component.

13. The light-emitting device of claim 1, further comprising an operative component located at an end of the housing that is used to operate the flashlight.

14. The light-emitting device of claim 13, the operative component capable of actuating at least one sub-mode that enables a different variation of the flashlight, the at least one sub-mode to be selected by manual operation of the tail switch.

15. The light-emitting device of claim 13, the operative component further comprising a sub-mode that turns the flashlight on for only a short period of time.

16. The light-emitting device of claim 13, the operative component further comprising a sub-mode that turns the flashlight on until the tail switch turns it off.

17. A light-emitting device, comprising:
    a housing;
    a cavity within the housing for containing a power supply and a battery power source;
    a light source on a first side of the cavity to emit light away from the housing;
    an arc lighter and an operative component on a second side of the cavity; and
    a USB charging port to receive and provide charge from an external device, the light source, USB charging port, arc lighter, and operative component functionally connected to at least one of the power bank and the battery power source;
    a circuit board on either side of the cavity, a conductive path between the circuit boards across the cavity establishing electrical communication from the power supply to the light source, USB charging port, arc lighter, and operative component.

18. The light-emitting device of claim 16, the device further comprising at least one operative component that switches between activation of the light source and the USB charging port.

19. A light-emitting device, comprising:
    a housing;
    a cavity centrally located within the housing for containing a power supply and a battery power source;
    a light source on a first side of the cavity, the light source to emit light away from the housing;
    an arc lighter on a second side of the cavity, the arc lighter to create a spark; and
    a tail cap with an operative component, the tail cap and operative component to removably attach to the second end of the housing and cover the arc lighter when not being used,
    the light source, arc lighter, and operative component each contacting a respective circuit board to establish a conductive path across the cavity for electrical communication from the power supply and battery and thus enable functionality.

20. The light-emitting device of claim 19, wherein a free end of the tail cap includes at least one of legs, ridges, or outer edges to allow the light-emitting device to stand upright when the tail cap is attached to the housing and the light-emitting device is placed on a flat surface.

* * * * *